US005361595A

United States Patent [19]

Shimura et al.

[11] Patent Number: 5,361,595
[45] Date of Patent: Nov. 8, 1994

[54] AIR-CONDITIONING APPARATUS

[75] Inventors: Kazuhiro Shimura; Takeshi Ookubo; Kouji Nagae; Takao Shiina, all of Gunma; Kunie Sekigami, Oota; Ichiro Kamimura, Gunma, all of Japan

[73] Assignee: Sanyo Electric Co., Ltd., Moriguchi, Japan

[21] Appl. No.: 21,890

[22] Filed: Feb. 24, 1993

[30] Foreign Application Priority Data

Feb. 28, 1992 [JP] Japan .................................. 4-078869
Feb. 28, 1992 [JP] Japan .................................. 4-078874
Apr. 9, 1992 [JP] Japan .................................. 4-116835

[51] Int. Cl.$^5$ ............................................... F25B 7/00
[52] U.S. Cl. ...................................... 62/175; 62/174; 62/192; 62/228.4
[58] Field of Search ............... 62/175, 510, 228.4; 236/1 EA

[56] References Cited

U.S. PATENT DOCUMENTS 4,633,672  1/1987  Persem et al. ................ 62/175 X
4,787,211 11/1988  Shaw ............................ 62/175 X

FOREIGN PATENT DOCUMENTS 0188630  7/1986  European Pat. Off. .
0426450  5/1991  European Pat. Off. .
3720889  1/1988  Germany .
0123944  5/1988  Japan .......................... 62/175
282035   3/1990  Japan ...................... F24F 5/00
285656   3/1990  Japan ...................... F25B 29/00
226053   5/1990  Japan ...................... F25B 13/00
2166228  4/1986  United Kingdom .......... 62/175
2246453  1/1992  United Kingdom .

Primary Examiner—William E. Wayner
Attorney, Agent, or Firm—Darby & Darby

[57] ABSTRACT

In a multiroom air-conditioning apparatus, refrigerant flow between plural outdoor side units is controlled so that abnormality (lack or excess) of refrigerant amount in an outdoor side unit in operation is redressed. For example, when surplus refrigerant exists in an outdoor side unit, the refrigerant flow is so controlled that the surplus refrigerant is pushed out (flow out) into an outdoor side unit in non-operation. In addition, the output of the air-conditioning apparatus is smoothly variable (controllable) in accordance with an air-conditioning load over the whole air-conditioning load range from the minimum (zero) load to the maximum load.

13 Claims, 18 Drawing Sheets

FIG. 9

| CONTENT OF CONTROL | REFERENCE NUMERALS OF VALVES | 55 | 25 | 23 | 59 | 60 |
|---|---|---|---|---|---|---|
| LUBRICANT CONTROL | OPERATION SIDE (FIRST OUTDOOR SIDE UNIT) | × | × | ○ | × | ○ |
| | DEMAND SIDE (SECOND OUTDOOR SIDE UNIT) | × | ○ | × | × | ○ |
| REFRIGERANT WITHDRAWAL (COOLING) (CORRESPONDING TO FIG. 2) | OPERATION SIDE (FIRST OUTDOOR SIDE UNIT) | ○ | ○ | × | × | ○ |
| | NON-OPERATION SIDE (SECOND OUTDOOR SIDE UNIT) | ○ | × | × | × | × |
| REFRIGERANT PUSH-OUT (CORRESPONDING TO FIG. 6) | OPERATION SIDE (FIRST OUTDOOR SIDE UNIT) | × | × | × | × | ○ |
| | NON-OPERATION SIDE (SECOND OUTDOOR SIDE UNIT) | × | × | × | × | ○ |

○···OPENED
×···CLOSED

FIG. 15

| UNIT 11,12 \ OUTPUT | 1~6 | 7~10 | 11~16 | 17~20 |
|---|---|---|---|---|
| 4PS RATING : A | — | 4 | — | 4 |
| 6PS INVERTER : B | 1~6 | 3~6 | 1~6 | 3~6 |
| 10PS RATING : C | — | — | 10 | 10 |

FIG. 16

| OUTPUT<br>BASIC EQUIPMENT | 10 | 11 | 12 | 13 | 14 | 15 | 16 | 17 | 18 | 19 |
|---|---|---|---|---|---|---|---|---|---|---|
| INV 5PS    INVERTER : 5PS | 2 | 1 |   | 1 | 1 | 1 |   | 1 |   | 1 |
| INV 6PS    INVERTER : 6PS |   | 1 | 2 |   |   |   |   | 2 |   | 1 |
| INV 8PS    INVERTER : 5PS<br>            INVERTER : 3PS |   |   |   | 1 | 1 |   | 1 |   |   |   |
| INV 10PS   INVERTER : 6PS<br>            RATING   : 4PS |   |   |   |   |   | 1 | 1 |   | 1 |   |
| RATING 8PS  RATING : 8PS |   |   |   |   |   |   |   |   | 1 | 1 |
| RATING 10PS RATING : 10PS |   |   |   |   |   |   |   |   |   |   |

FIG. 17

| BASIC EQUIPMENT \ OUTPUT | 20 | 21 | 22 | 23 | 24 | 25 | 26 | 27 | 28 | 29 | 30 |
|---|---|---|---|---|---|---|---|---|---|---|---|
| INV 5PS    INVERTER : 5PS |   | 1 |   | 1 |   | 1 |   |   |   |   |   |
| INV 6PS    INVERTER : 6PS |   | 1 | 2 |   |   |   |   |   |   |   |   |
| INV 8PS    INVERTER : 5PS / INVERTER : 3PS |   |   |   | 1 | 1 |   |   |   |   |   |   |
| INV 10PS   INVERTER : 6PS / RATING : 4PS | 1 |   |   |   |   | 1 | 1 |   | 1 |   | 1 |
| RATING 8PS  RATING : 8PS | 1 | 1 | 1 | 1 | 2 |   | 2 |   | 1 |   |   |
| RATING 10PS RATING : 10PS |   |   | 1 | 1 |   | 1 |   |   | 1 |   | 2 |

AIR-CONDITIONING APPARATUS

BACKGROUND OF THE INVENTION

1. Field of the Invention

This invention relates to an air-conditioning apparatus having at least one room unit (indoor side unit) and plural outdoor side units which are connected in parallel to an interunit pipe extending from the room unit.

2. Description of Related Art

A multiroom air-conditioning apparatus for simultaneously cooling or heating a plurality of rooms of a building has been generally known. This multiroom air-conditioning apparatus is disclosed in Japanese Laid-open Patent Application No. 2-85656, and is so constructed that a plurality of outdoor side units each having a compressor, an outdoor heat exchanger, etc. are arranged so as to be connected in parallel to an interunit pipe connected to each room unit. This type of multiroom air-conditioning apparatus has an advantage that realization of a large-capacity system can be promoted for such an apparatus.

This type of multiroom air-conditioning apparatus has been conventionally so designed that a refrigerant flow between each outdoor side unit and each indoor side unit (room unit) is controlled through closing and opening operations of a valve, and the closing and opening operations of each valve are carried out with an individual controller which is individually provided to each outdoor side unit. In this construction, alteration of the number of outdoor side units or indoor side units to be connected necessarily requires the control operation (program) of each outdoor side unit to be individually altered, or requires each of the individual controllers itself to be replaced by another. Therefore, the conventional multiroom air-conditioning apparatus has had a disadvantage that the individual controllers can not be fixedly used without modification or replacement in any status.

Further, in the conventional multiroom air-conditioning apparatus thus constructed, the same refrigerant flows in or out over plural outdoor side units which are arranged in parallel in the same system. Therefore, there occurs a problem that in a case where the refrigerant is partially trapped (naturally stocked) in an outdoor side unit located adjacently to an outdoor side unit in operation, the outdoor side unit in operation lacks the refrigerant, and a so-called "gas-lacking state" occurs in the outdoor side unit in operation.

In addition, in a case where a large amount of refrigerant concentratively flows into an outdoor side unit, there occurs a problem that surplus refrigerant is liable to be trapped in an outdoor heat exchanger, etc. of the outdoor side unit. For example, when the refrigerant is trapped in the outdoor heat exchanger in a cooling operation, liquefaction of the refrigerant is depressed because a heat-discharge area is reduced.

Further, in this type of multiroom air-conditioning apparatus having plural outdoor side units arranged in parallel, the air-conditioning operation is so controlled that the operation of some outdoor side units (compressors) is ceased when an air-conditioning load is reduced to a value lower than the total output of the compressors of the outdoor side units. In such a control operation, the output of the air-conditioning apparatus is required to be smoothly controlled over an air-conditioning load range of the minimum (zero) air-conditioning load to the maximum air-conditioning load.

SUMMARY OF THE INVENTION

An object of this invention is to provide an air-conditioning apparatus in which outdoor side units can be fixedly used without modification or replacement in any status, and even when an outdoor side unit in operation lacks refrigerant, refrigerant is supplied to the refrigerant-lacked outdoor side unit in operation to adjust the refrigerant amount of the outdoor side unit to a proper value, and a control method for the air-conditioning apparatus.

Another object of this invention is to provide an air-conditioning apparatus in which when surplus or excessive refrigerant exists or trapped in an outdoor side unit, the surplus refrigerant is discharged from the outdoor side unit to another outdoor side unit to adjust the refrigerant amount of the outdoor side unit having the surplus or excessive refrigerant to a proper value, and a control method for the air-conditioning apparatus.

Another object of this invention is to provide an air-conditioning apparatus in which the output of the air-conditioning apparatus can be smoothly controlled over the air conditioning load range from its minimum (zero) load to its maximum load.

In order to attain the above objects, in the multiroom air-conditioning apparatus of this invention, each outdoor side unit is equipped with individual control means for controlling opening and closing operations of an opening and closing valve, and central control means for controlling these individual control means of all outdoor side units collectively and intercommunicatively.

That is, according to one aspect of this invention, the air-conditioning apparatus according to this invention comprises at least one indoor side unit, plural outdoor side units which are connected in parallel to an interunit pipe extending from the indoor side unit, opening and closing means which is provided to each outdoor side unit and serves to control refrigerant flow between the indoor side unit and the outdoor side unit through an opening and closing operation thereof, individual control means which is provided to each outdoor side unit and serves to control the opening and closing operation of the opening and closing means, detection means for detecting excess or lack state of refrigerant amount and/or lubricating oil amount in an outdoor side unit, which will obstruct the operation of the outdoor side unit, and central control means for collectively and concentratively controlling each of the individual control means of the plural outdoor side units to adjust the amount of the refrigerant and/or lubricating oil flowing among the plural outdoor side units, so that the excess or lack state of the refrigerant and/or lubricating oil amount of the outdoor side unit is redressed.

According to the air-conditioning apparatus thus constructed, not only the individual control means for individually controlling each outdoor side unit, but also the central control means for collectively controlling the individual means are equipped, so that the alteration of the control operation (control program) in accordance with the alteration of the number of the interconnected outdoor side units or indoor side units can be made by merely altering the control operation (control program) of the central control means. Therefore, it is not necessary to individually alter the control operation (control program) of each individual control means or replace each individual control means by another, and thus the individual control means can be fixedly and commonly usable for any case.

Further, the air-conditioning apparatus may be equipped with a return pipe for returning lubricating oil separated in a oil separator of each outdoor side unit to a compressor, the return pipe being connected through a fluid flowing passageway to a return pipe of another outdoor side unit, and a first refrigerant withdrawing passageway for connecting the fluid flowing passageway to the outdoor heat exchanger, the first refrigerant withdrawing passageway having an opening and closing valve which serves to control the refrigerant and/or lubricating oil flow therethrough between the outdoor side units so that the excess or lack state of the refrigerant and/or lubricating oil amount which will obstruct the operation of an outdoor side unit is redressed when the excess or lack of the refrigerant and/or lubricating oil amount in the outdoor side unit is detected. For example, when an outdoor side unit in operation suffers a refrigerant-lacking state which will obstruct the operation thereof, the opening and closing valve is so controlled that a proper amount of refrigerant trapped in another outdoor side unit in non-operation is fed to the refrigerant-lacking outdoor side unit through the opening and closing operation of the opening and closing valve.

Still further, the air-conditioning apparatus may be equipped with a refrigerant adjusting container in a refrigerant pipe of each outdoor side unit, a second refrigerant withdrawing passageway through which the refrigerant adjusting container is connected to the fluid flowing passageway, and a third refrigerant withdrawing passageway through which the fluid flowing passageway is connected to a discharge pipe of the compressor, each of the second and third refrigerant withdrawing passageway being equipped with an opening and closing valve through which a part of high-pressure refrigerant in an outdoor side unit in operation, suffering a refrigerant-lacking state which will obstruct the operation thereof, is fed to a refrigerant adjusting container of a refrigerant-trapped outdoor side unit.

According to the air-conditioning apparatus thus constructed, when an outdoor side unit suffers the refrigerant-lacking state which will obstruct the operation thereof, the air-conditioning apparatus is so controlled that the refrigerant is withdrawn from an outdoor side unit in non-operation to the refrigerant-lacking outdoor side unit. Therefore, the lack of the refrigerant in the refrigerant-lacking outdoor side unit can be redressed.

According to another aspect of this invention, in the air-conditioning apparatus having at least one indoor side unit and plural outdoor side units which are connected in parallel to an inter-unit pipe extending from the indoor side unit, at least one outdoor side unit of the plural outdoor side units is equipped with a capacity-invariable compressor and a capacity-variable compressor whose capacity is variable in accordance with an air-conditioning load.

In the air-conditioning apparatus thus constructed, each of the other residual outdoor side units is equipped with a capacity-invariable compressor, and the total output ps1 of the compressor of the outdoor side unit having both of the capacity-invariable compressor and the capacity-variable compressor and the output ps2 of the compressor of the outdoor side unit having only the capacity-invariable compressor are beforehand set so as to satisfy the following equation:

$$ps1 \geqq ps2$$

According to the air-conditioning apparatus thus constructed, the output of the air-conditioning apparatus can be smoothly controlled over an air-conditioning range from the minimum (zero) air-conditioning load to the maximum air-conditioning load.

As described above, according to this invention, not only the individual control means for individually controlling each outdoor side unit, but also the central control means for collectively controlling the individual means are equipped, so that the alteration of the control operation (control program) in accordance with the alteration of the number of the interconnected outdoor side units or indoor side units can be made by merely altering the control operation (control program) of the central control means. Therefore, it is not necessary to individually alter the control operation (control program) of each individual control means or replace each individual control means by another, and thus the individual control means can be fixedly and commonly usable for any case.

Further, according to this invention, for example when an outdoor side unit suffers a refrigerant-lacking state which will obstruct the operation thereof, the refrigerant is withdrawn from an outdoor side unit in non-operation to the refrigerant-lacking outdoor side unit through the opening and closing operation of the opening and closing valve. Therefore, the lack of the refrigerant in the refrigerant-lacking outdoor side unit can be redressed.

Still further, according to this invention, when a refrigerant-excessive state which will obstruct the operation of an outdoor side unit in operation is detected by the detection means, it is judged by the control means whether there is an outdoor side unit in non-operation. If the outdoor side unit in non-operation is judged to exist, the surplus refrigerant is fed from the outdoor side unit in operation having the surplus refrigerant to the outdoor side unit in non-operation, thereby redressing the refrigerant-excessive state in the outdoor side unit in operation.

Still further, according to this invention, when the air-conditioning load is varied, the capacity of the capacity-variable compressor is varied in accordance with the variation of the air-conditioning load while suitably combined with the capacity of the capacity-invariable compressors, so that the output of the air-conditioning apparatus can be smoothly controlled over an extremely wide range.

BRIEF DESCRIPTION OF THE DRAWINGS

FIG. 9 shows a table showing an opening and closing status of each opening and closing valve;

FIG. 15 shows a table showing a combination of compressors;

FIG. 16 shows a table showing another combination of compressors;

FIG. 17 shows a table showing another combination of compressors; and

DETAILED DESCRIPTION OF PREFERRED EMBODIMENTS

Preferred embodiments according to this invention will be described with reference to the accompanying drawings.

In order to simplify the description of this invention, two outdoor side units and one indoor side unit are representatively illustrated in the figures, however, the number of the outdoor side units and the number of the indoor side units are not limited to two and one respectively, and any number of outdoor side units and indoor side units may be used for this invention.

Figure 1:
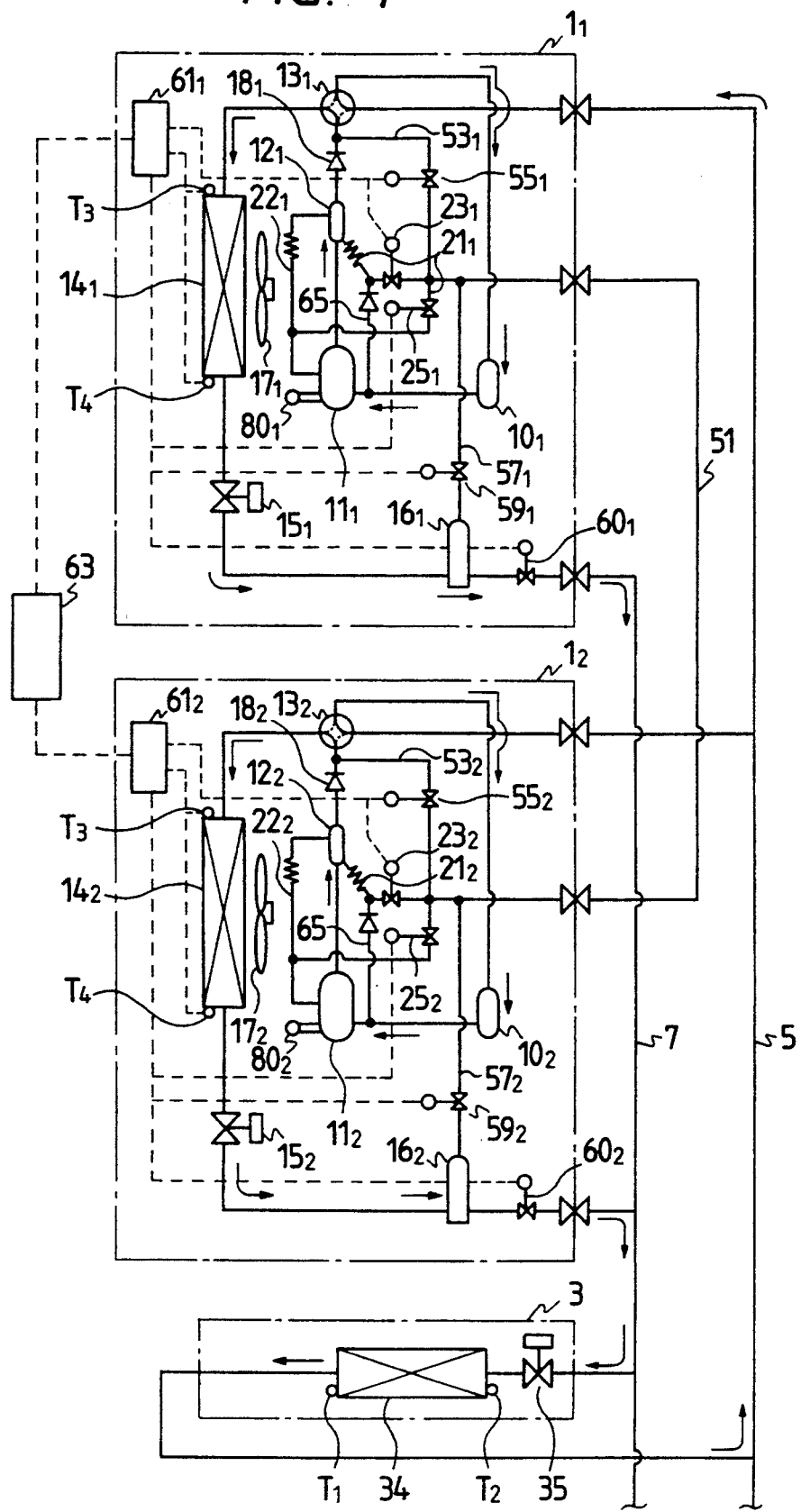
FIG. 1 is a refrigerant circuit diagram of a first embodiment of a multiroom air-conditioning apparatus of this invention.

In FIG. 1, reference numerals $1_1$ and $1_2$ represent outdoor side units, and a reference numeral 3 represents an indoor side unit (room unit). The outdoor side unit $1_1$ comprises an accumulator $10_1$, a compressor $11_1$, an oil (refrigerant-lubricating oil) separator $12_1$, a four-way change-over valve $13_1$, an outdoor heat exchanger $14_1$, an outdoor electrical expansion valve $15_1$, and a refrigerant adjusting container $16_1$. A reference numeral 80 represents an oil surface sensor (detection means) provided at a side portion of the compressor $11_1$. The sensor 80 is provided with a float (not shown), and serves to detect the amount of lubricating oil in the compressor $11_1$ to output a detection value to the individual controller $61_1$. A reference numeral $17_1$ represents a cooling blower for the outdoor heat exchanger $14_1$. The construction of the outdoor side unit $1_2$ is substantially identical to that of the outdoor side unit $1_1$, containing a construction as described below, and thus the description thereof is eliminated from the following description.

The indoor side unit 3 comprises an indoor heat exchanger 34 and an indoor electrical expansion valve 35 (hereinafter referred to as "indoor mechanical valve"). The indoor side unit 3 is provided with an inter-unit pipe comprising a gas pipe 5 and a liquid pipe 7 which extend from the indoor side unit 3, and the outdoor side units $1_1$ and $1_2$ are connected in parallel to the inter-unit pipe. As not shown, plural outdoor side units 3 each having the above construction are arranged so as to be connected to the inter-unit pipe of each indoor unit in parallel.

The oil separator $12_1$ serves to separate or extract lubricating oil from mixture of refrigerant and lubricating oil which is discharged from the compressor $11_1$, and the separated lubricating oil is returned through return pipes (oil withdrawing passageways) $21_1$ and $22_2$ to the compressor $11_1$. The return pipe $21_1$ is provided with opening and closing valves $23_1$ and $25_1$ for controlling the lubricating oil flow between the oil separator $12_1$ and the compressor $11_1$ through its opening and closing operation. The return pipe $21_1$ is connected to a suck-in pipe of the compressor $11_1$ through a pipe 65.

The return pipes $21_1$ and $21_2$ of the outdoor side units $1_1$ and $1_2$ are connected through a refrigerant flowing passageway (hereinafter referred to as a balance pipe") 51 to each other. The balance pipe 51 is connected to the four-way change-over valve $13_1$ and a check valve $18_1$ through a refrigerant withdrawing passageway (hereinafter referred to as "third auxiliary pipe") $53_1$, and the third auxiliary pipe $53_1$ is provided with a third opening and closing valve $55_1$ for controlling refrigerant flow through the third auxiliary pipe $53_1$. The balance pipe 51 is intercommunicated to the outdoor heat exchanger $14_1$ when the third opening and closing valve $55_1$ is opened and the four-way change-over valve $13_1$ is switched to a switch position as indicated by a solid line of FIG. 1.

That is, a passageway extending from the third auxiliary pipe $53_1$ through the four-way change-over valve $13_1$ to the outdoor heat exchanger $14_1$ serves as a first refrigerant withdrawing passageway (hereinafter referred to as "first auxiliary pipe") through which the balance pipe 51 is connected to the outdoor heat exchanger $14_1$.

The refrigerant adjusting container $16_1$ is connected to the balance pipe 51 through a second refrigerant withdrawing passageway (hereinafter referred to as "second auxiliary pipe") $57_1$, and the second auxiliary pipe $57_1$ is provided with a second opening and closing valve $59_1$. The liquid pipe 7 of the refrigerant controller $16_1$ is provided with an opening and closing valve $60_1$. The opening and closing valve $60_1$ comprises an unidirectional electromagnetic valve, and thus the liquid flow from the left side to the right side in FIG. 1 can not be intercepted.

In FIG. 1, $T_1$ and $T_2$ represent temperature sensors for detecting temperature at the outlet and inlet of the indoor heat exchanger 34 respectively, and $T_3$ and $T_4$ represent temperature sensors for detecting temperature at the outlet and inlet of the outdoor heat exchanger $14_1$ ($14_2$).

According to this embodiment, each of the outdoor side units $1_1$ and $1_2$ is provided with an individual controller $61_1$ ($61_2$) for controlling the opening and closing operation of the various kinds of opening and closing valves in each outdoor side unit, and the outdoor side units $1_1$ and $1_2$ are independently driven by the individual controllers $61_1$ and $61_2$, respectively. Each of the individual controllers $61_1$ and $61_2$ is connected to each of the temperature sensors $T_3$ and $T_4$, and monitors variation of temperature through each temperature sensor. These individual controllers $61_1$ and $61_2$ are connected to a central controller 63, and the operation thereof are collectively controlled by the central controller 63.

With this construction, the alteration of the control operation of the whole system of the air-conditioning apparatus, which will be required in accordance with the alteration of the number of the outdoor side units or indoor side units, can be performed by merely altering the control operation (program) of only the central controller, so that it is not required to replace each individual controller itself or alter the control operation (program) of each individual controller. Therefore, the air-conditioning control can be performed for any case using merely about six kinds of individual controllers. That is, the individual controllers can be fixedly and commonly usable for any case.

Next, the air-conditioning operation of the air-conditioning apparatus thus constructed will be described.

When the four-way change-over valves $13_1$ and $13_2$ are swathed as indicated by a solid line of FIG. 1, the refrigerant flows in a direction as indicated by an arrow of FIG. 1. In this case, both of the outdoor side units $1_1$ and $1_2$ are driven, the outdoor electrical expansion valves $15_1$ and $15_2$ are substantially fully opened, and the opening degree of the outdoor mechanical valve 35 is adjusted in accordance with an air-conditioning load. Therefore, each of the outdoor heat exchangers $14_1$ and $14_2$ serves as a condenser, and the indoor heat exchanger 34 serves as an evaporator. That is, a cooled air (wind) is fed from the indoor heat exchanger 34 (a cooling operation is carried out).

On the other hand, when the four-way change-over valves $13_1$ and $13_2$ are switched as indicated by a dotted line of FIG. 1, the refrigerant flows in a direction opposite to the direction as indicated by the arrow. In this case, both of the outdoor side units $1_1$ and $1_2$ are driven, and the opening degree of the indoor electrical expansion valves $15_1$ and $15_2$ and the indoor mechanical valve 35 are adjusted in accordance with the load. Therefore, each of the outdoor heat exchangers $14_1$ and $14_2$ serves as an evaporator, and the indoor heat exchanger 34 serves as a condenser. That is, a heated air (wind) is fed from the indoor heat exchanger 34 (a heating operation is carried out).

In the cooling and heating operations as described above, for example when the lubricating oil amount of the compressor $11_1$ of the outdoor side unit $1_1$ is kept to a predetermined amount, the lubricating oil amount of the compressor $11_2$ of the outdoor side unit $1_2$ is below a predetermined amount and parts of the compressor $11_2$ such as a rotor, etc. is about to be worn, the opening and closing valves $23_1$, $23_2$ and $25_2$ are opened, the opening and closing valve $25_1$ is closed, and the lubricating oil which is separated in the oil separator $12_1$ of the outdoor side unit $1_1$ is guided through the balance pipe 51 to the compressor $12_2$ of the outdoor side unit $12_2$. That is, the balance pipe 51 serves to keep the balance of lubricating oil amount between the respective compressors.

This invention is characterized in that the refrigerant amount of each of the outdoor side units $1_1$ and $1_2$ is adjusted using the balance pipe 51, and the adjustment of the refrigerant amount will be hereunder described.

In the air-conditioning apparatus as described above, when the refrigerant is trapped in an outdoor side unit in non-operation which is located adjacently to an outdoor side unit in operation, there may occur a case where the outdoor side unit in operation lacks the refrigerant and the gas (refrigerant)-lacking state is induced.

In this case, according to this embodiment, a control operation for feeding the refrigerant from the refrigerant-trapped outdoor side unit in non-operation to the refrigerant-lacking outdoor side unit in operation is carried out. This control operation is carried out by opening and closing the various kinds of control valves through the central controller 63 and the individual controllers $61_1$ and $61_2$.

This control operation in each of the cooling operation and the heating operation will be individually described in detail. The refrigerant is liable to be trapped in the outdoor heat exchanger, the refrigerant adjusting controller, etc. of the outdoor side unit in non-operation, however, in order to simplify the description, a case where the refrigerant trapped particularly in the outdoor heat exchanger is fed to the refrigerant-lacking outdoor side unit will be representatively described.

Figure 3:
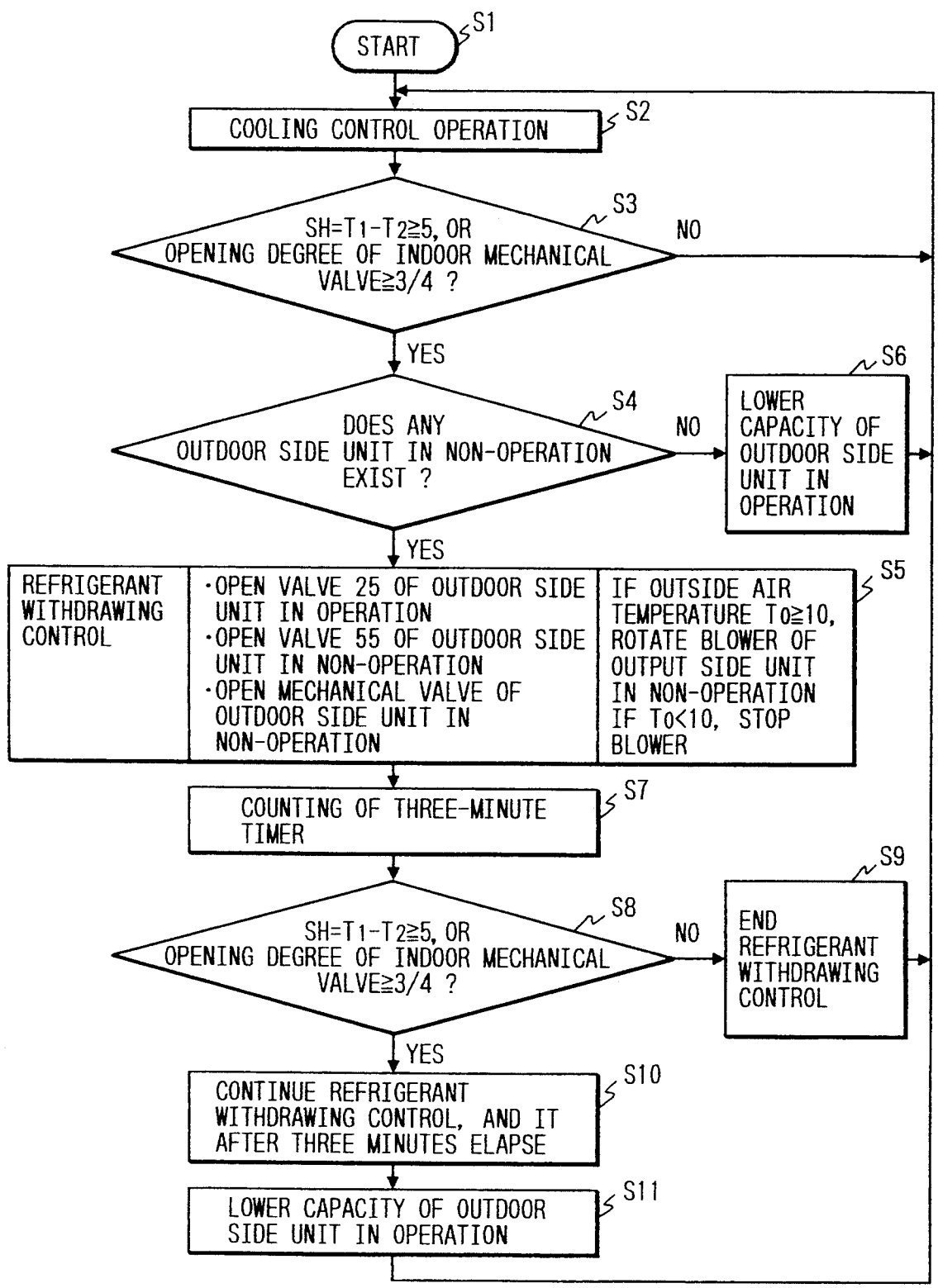
FIG. 3 is a flowchart for a refrigerant withdrawing process in a cooling operation.

First, the control operation in the cooling operation will be described with reference to a flowchart as shown in FIG. 3.

First, the air-conditioning operation is started (S1) to carry out a cooling operation (at a step S2), for example. At this time, it is judged whether the difference SH between the temperatures at the outlet and inlet of the indoor side unit is above 5° C. ($SH = T_1 - T_2 \geq 5°$ C.), or the opening degree of the indoor mechanical valve 35 is above $\frac{3}{4}$ (opening degree $\geq \frac{3}{4}$) (at a step S3). When an outdoor side unit in operation lacks refrigerant, the amount of the refrigerant flowing into the indoor heat exchanger 34 is reduced. Therefore, the flow-in refrigerant is heated to a temperature higher than a predetermined temperature (5° C.) if quantity of heat to be supplied is constant. Further, since the amount of the refrigerant flowing into the indoor heat exchanger 34 is reduced, the opening degree of the indoor mechanical valve 35 is increased to a value higher than a predetermined value ($\frac{3}{4}$), and thus a large amount of refrigerant is so controlled as to flow into the indoor heat exchanger 34. By detecting such a phenomenon at the step S3, it is judged whether an outdoor side unit in operation lacks the refrigerant. If the judgment at the step S3 is "No", the outdoor side unit in operation is judged not to lack the refrigerant, and thus the control of the cooling operation is continued. On the other hand, if the judgment at the step S3 is "Yes", the outdoor side unit in operation is judged to lack the refrigerant, and thus it is checked whether there exists an outdoor side unit in non-operation from which the refrigerant can be withdrawn (at a step S4).

Here, if the judgment at the step S4 is "Yes", a control operation for withdrawing the refrigerant from the outdoor side unit in operation is executed (at a step S5).

Figure 2:
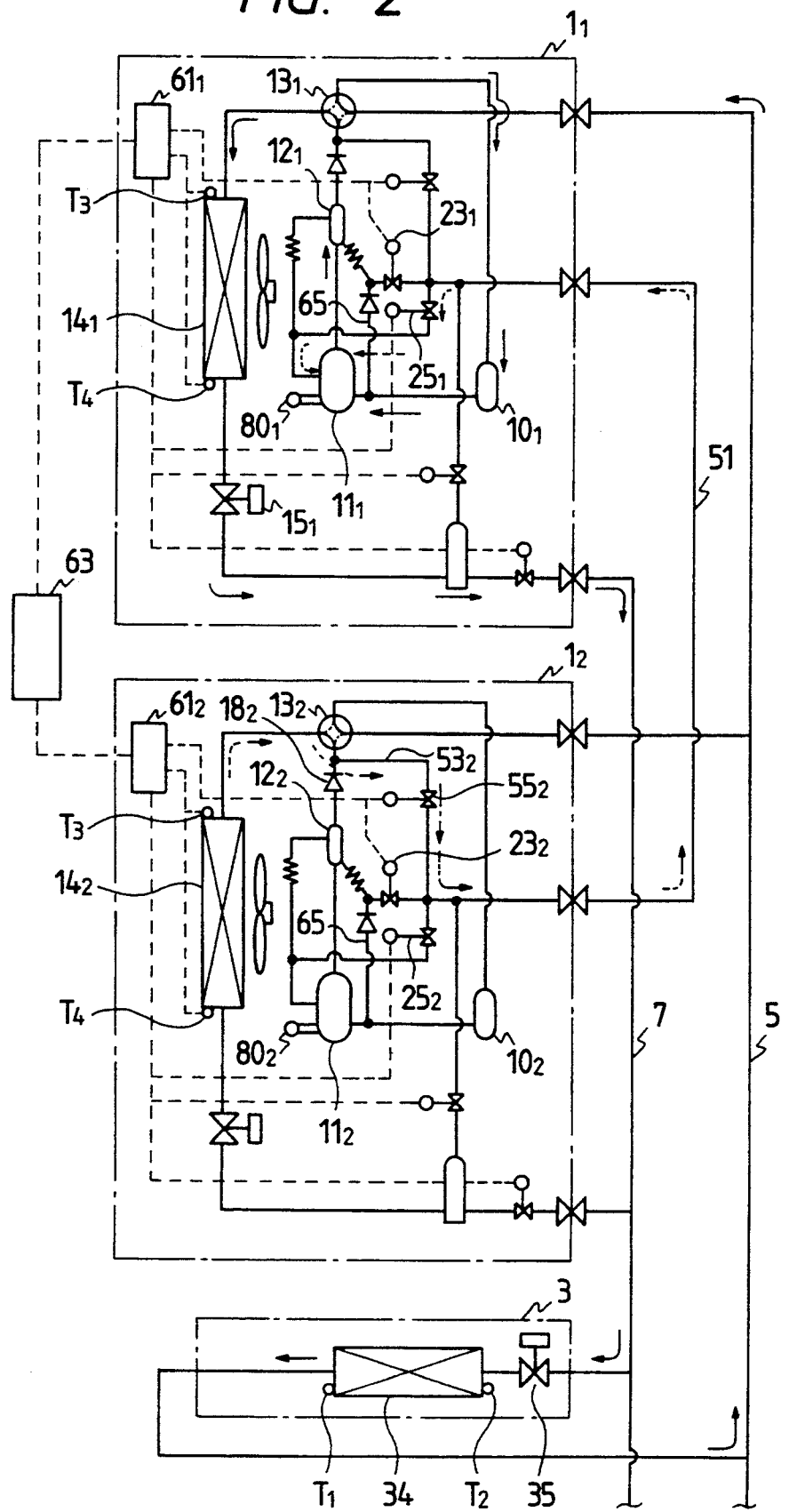
FIG. 2 is a refrigerant circuit diagram showing the refrigerant flow in a refrigerant withdrawing operation in a cooling operation of a second embodiment.

Concretely, as shown in FIG. 2, the opening and closing valve $25_1$ and the opening and closing valve $60_1$ of the outdoor side unit $1_1$ in operation are opened, and the third opening and closing valve $55_2$ of the refrigerant-trapped outdoor side unit $1_2$ in non-operation is opened. The opening and closing operations of the various valves are shown in a table of FIG. 9. Here, in this case, the valves other than the above valves are closed.

Through this opening and closing operation of the valves, since a passageway extending from the balance pipe 51 to the compressor $11_1$ is originally kept under a lower pressure in the return pipe $21_1$ of the compressor $11_1$ in operation than a pressure in the outdoor side unit $1_2$, the refrigerant which has been trapped in the outdoor heat exchanger $14_2$, etc. of the outdoor side unit 2 in non-operation flows through the passageway extending from the outdoor heat exchanger $14_2$ through the four-way change-over valve $13_2$ and the third auxiliary pipe $53_2$ to the balance pipe 51, that is, through the first auxiliary pipe and flows into the return pipe $21_1$ of the compressor $11_1$ in operation, as indicated by an arrow of FIG. 2. Therefore, the lack of the refrigerant in the outdoor side unit $1_1$ in operation is prevented, and thus no gas-lacking state occurs.

When the outside air temperature $T_0$ exceeds about 10° C., it is preferable to drive a blower (fan) $17_2$ for the outdoor heat exchanger $14_2$ of the refrigerant-trapped outdoor side unit $1_2$ in non-operation. The driving of the blower $17_2$ promotes gasification of the refrigerant, and thus the refrigerant can be more easily withdrawn.

If at the step S4 (see FIG. 3) it is judged that there is no outdoor side unit in non-operation, there is no trapped refrigerant, and thus the driving capacity of the refrigerant-lacking outdoor side unit is lowered (at a step S6). If it is an outdoor side unit having a capacity-invariable compressor, the operation of the outdoor side unit is stopped while if it is an outdoor side unit having a compressor equipped with an inverter, the frequency of the compressor is lowered to lower the rotating speed of the compressor.

The refrigerant withdrawing control operation as described above is continued for about three minutes (at a step S7).

After lapse of three minutes, the judgement at the step S3 is carried out again (at a step S8). Here, if the judgement at the step S3 is "No", the refrigerant lack is judged to be redressed, so that the refrigerant withdrawing control at the step S5 is ended (at a step S9). On the other hand, it the judgment at the step S3 is "Yes", the refrigerant lack is judged not to be redressed, and thus the refrigerant withdrawing control at the step S5 is continued (at a step S10).

However, at the step S10, the refrigerant withdrawing control is continued for about three minutes, and it is ended after three minutes elapse. A control time for the steps S5 and S6 extends to about six minutes, and thus the refrigerant can be estimated to be withdrawn during this control time. If the refrigerant lack occurs even in such a status, it is judged that no trapped refrigerant exists in the outdoor side unit in non-operation. Therefore, similarly at the step S6, the driving capacity of the refrigerant-lacking outdoor side unit is lowered (at a step S11).

Figure 4:
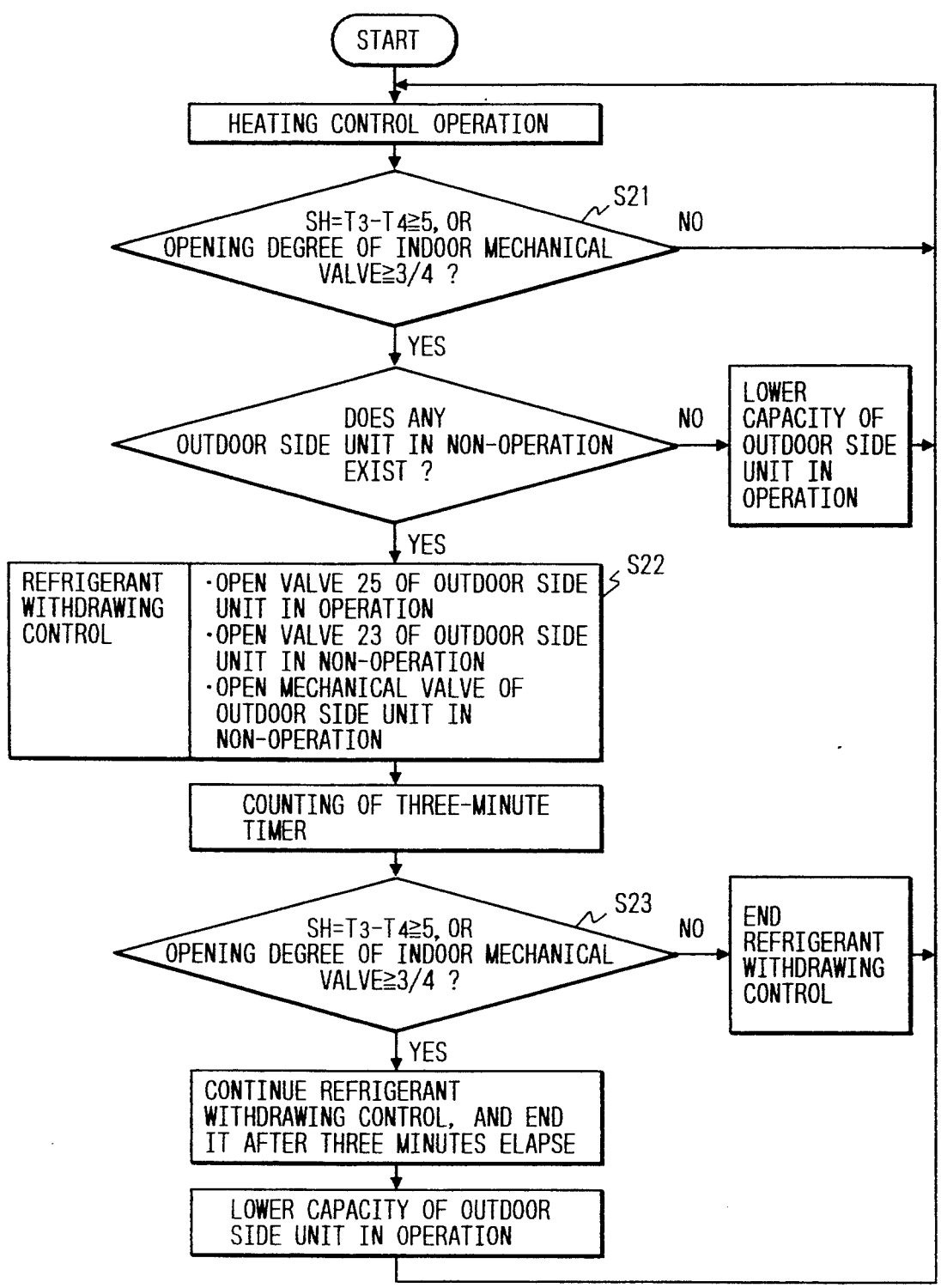
FIG. 4 is a flowchart for a refrigerant withdrawing process in a heating operation.

Next, the control operation in the heating operation will be described with reference to a flowchart as shown in FIG. 4.

Figure 5:
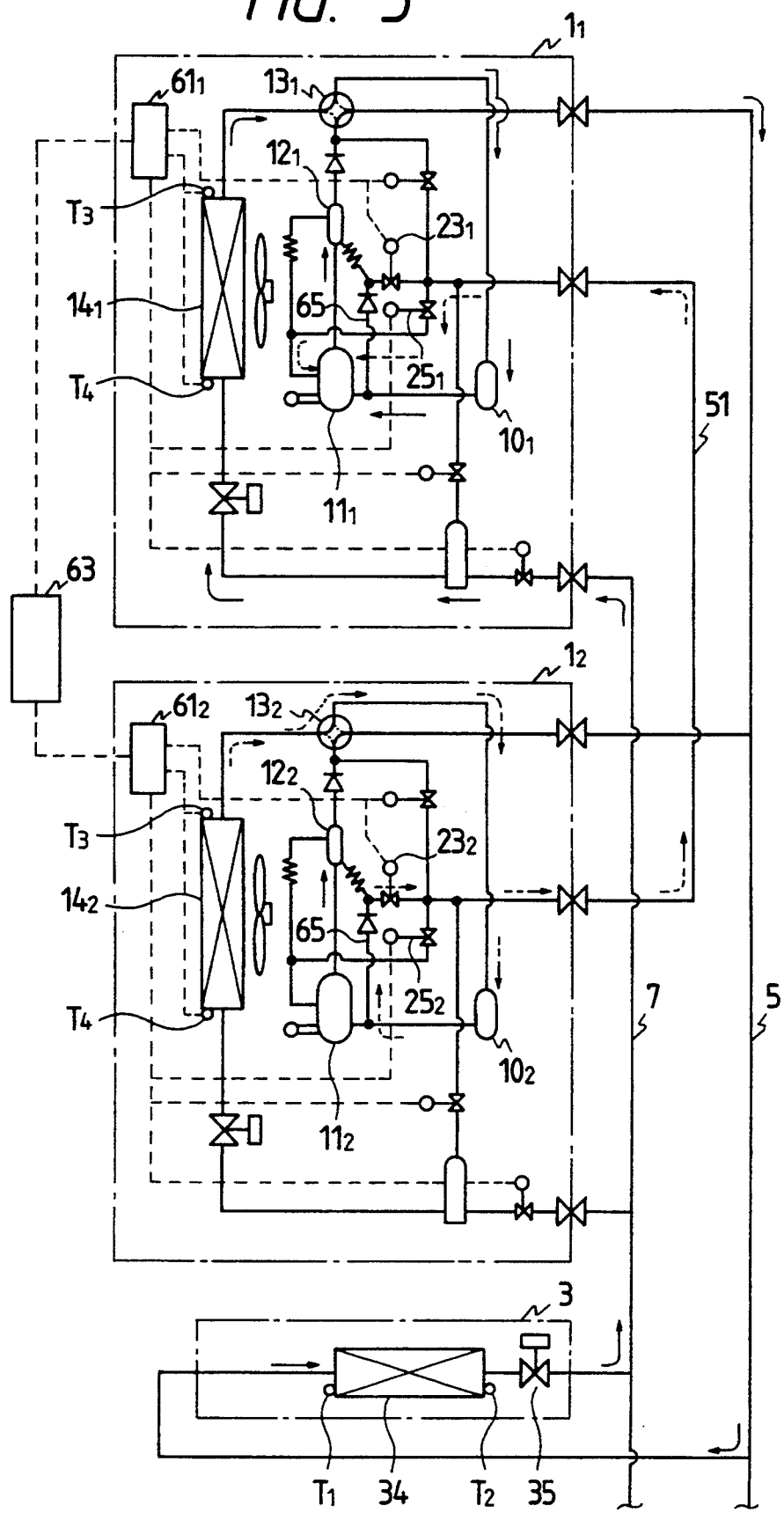
FIG. 5 is a refrigerant circuit diagram showing the refrigerant flow in a refrigerant withdrawing operation in a heating operation of the second embodiment.

The different operations in the heating operation from those in the cooling operation are as follows. That is, the judgement of the refrigerant lack is made on the basis of the difference between the temperatures at the outlet and inlet of the outdoor heat exchanger (SH=$T_3-T_4$) (at steps S21 and 23), and the blower of the outdoor heat exchange whose refrigerant is withdrawn is not driven in the refrigerant withdrawing control operation (at a step S22). If the blower is driven in the heating operation (in winter), the refrigerant would be liquefied by cold outside air, and thus it would be difficult to withdraw the refrigerant of the outdoor heat exchanger. In the heating operation, the four-way change-over valves $13_1$ and $13_2$ are switched as indicated by a solid line of FIG. 5, and the refrigerant to be withdrawn flows in a direction as indicated by a dotted line in the refrigerant withdrawing operation under the heating operation.

In the embodiment as described above, the refrigerant trapped in the outdoor heat exchanger is withdrawn into the refrigerant-lacking outdoor side unit by utilizing the lower pressure (than the pressure in the outdoor side unit) of the passageway extending from the balance pipe 51 to the compressor $11_1$. In the following embodiment, the refrigerant trapped in the refrigerant adjusting container of an outdoor side unit in non-operation is fed (withdrawn) into a refrigerant-lacking outdoor side unit by utilizing a part of high-pressure refrigerant of the outdoor side unit.

Figure 6:
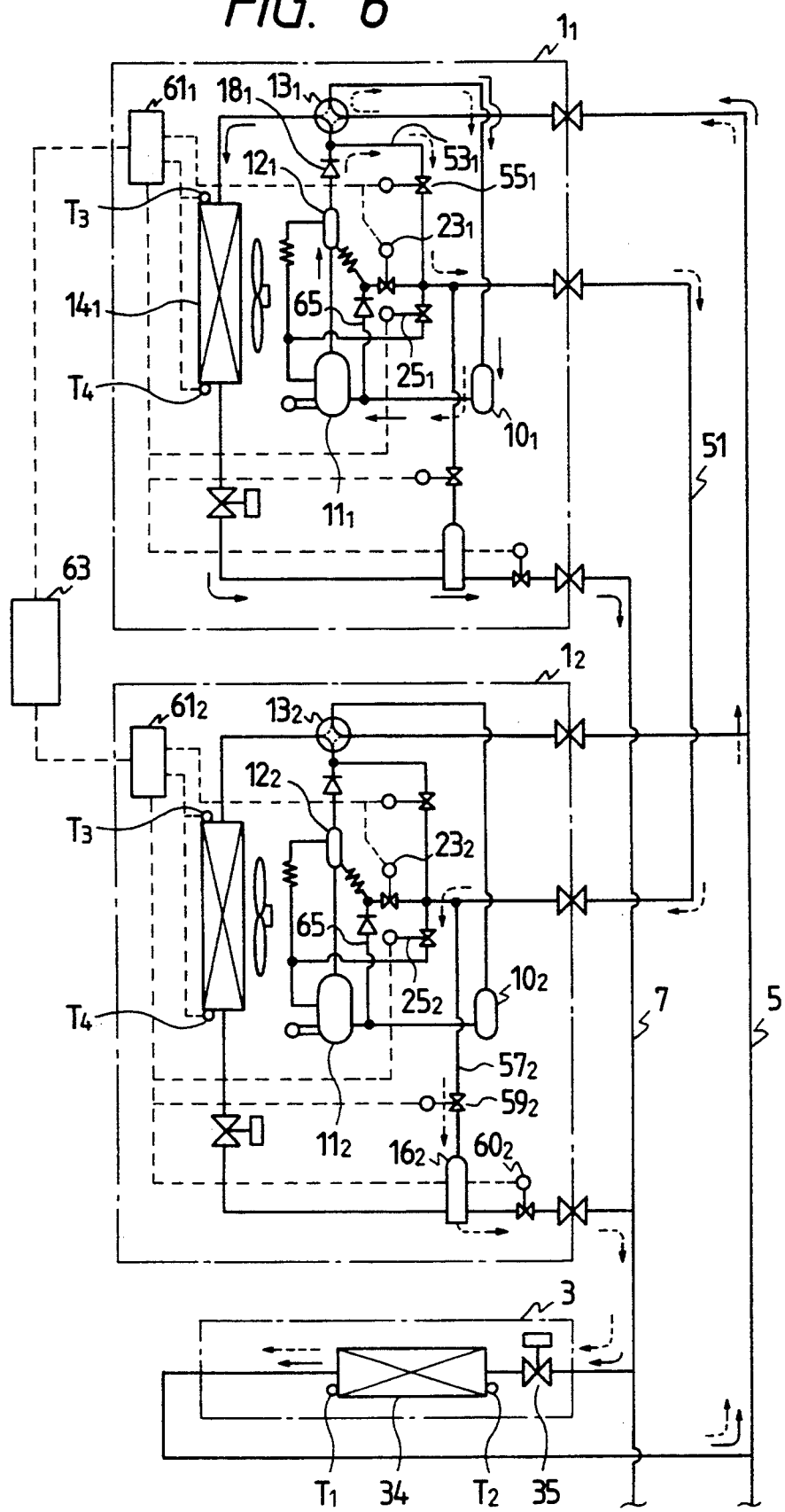
FIG. 6 is a refrigerant circuit diagram of a third embodiment of this invention.

FIG. 6 is a refrigerant circuit diagram of this type of embodiment of the air-conditioning apparatus.

According to this embodiment, when the outdoor side unit $1_1$ in operation lacks refrigerant, a part of the high-pressure refrigerant in the outdoor side unit $1_1$ is fed into the refrigerant adjusting container of the refrigerant-trapped outdoor side unit $1_2$ in non-operation to push out refrigerant trapped in the refrigerant adjusting container of the outdoor side unit $1_2$ in non-operation to the compressor $11_1$ of the outdoor side unit $1_1$ in operation.

The air-conditioning control in the cooling operation of this embodiment will be first described with reference to FIG. 7.

Figure 7:
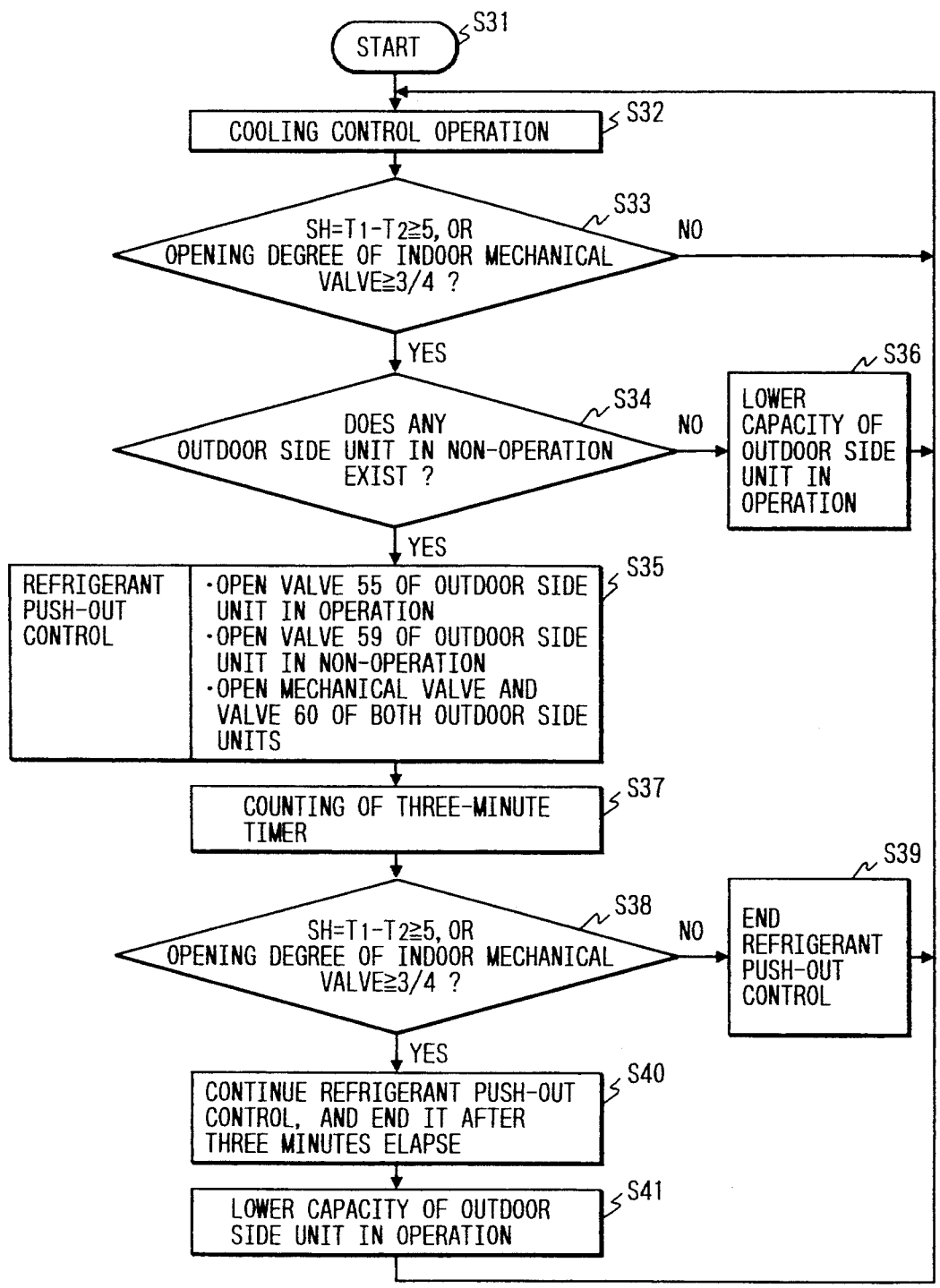
FIG. 7 is a flowchart for a process in the cooling operation of the third embodiment.

In FIG. 7, the air-conditioning operation is first started (at a step S31) to carry out the cooling operation (at a step S32). During the cooling operation, it is judged at a step S33 whether the temperature difference SH between the temperatures ($T_1$, $T_1$) at the outlet and inlet of the indoor heat exchanger 34 is above 5° C. (SH=$T_1-T_2 \geqq 5°$ C.), or the opening degree of the indoor mechanical valve 35 is above $\frac{3}{4}$ (opening degree $\geqq \frac{3}{4}$).

That is, at the step S33, it is judged whether the outdoor side unit is operation lacks refrigerant. If the judgment at the step S33 is "No", no refrigerant lack is judged, and thus the cooling control operation is continued without alteration. On the other hand, if the judgment at the step S33 is "Yes", the refrigerant lack is judged for the outdoor side unit in operation, and thus it is checked at a step S34 whether there exists an outdoor side unit in non-operation from which refrigerant can be withdrawn.

Here, if the judgment at the step S34 is "Yes", a refrigerant push-out (flow-out) control operation is executed at a step S35 to push out the refrigerant trapped in the outdoor side unit in non-operation.

Figure 10:
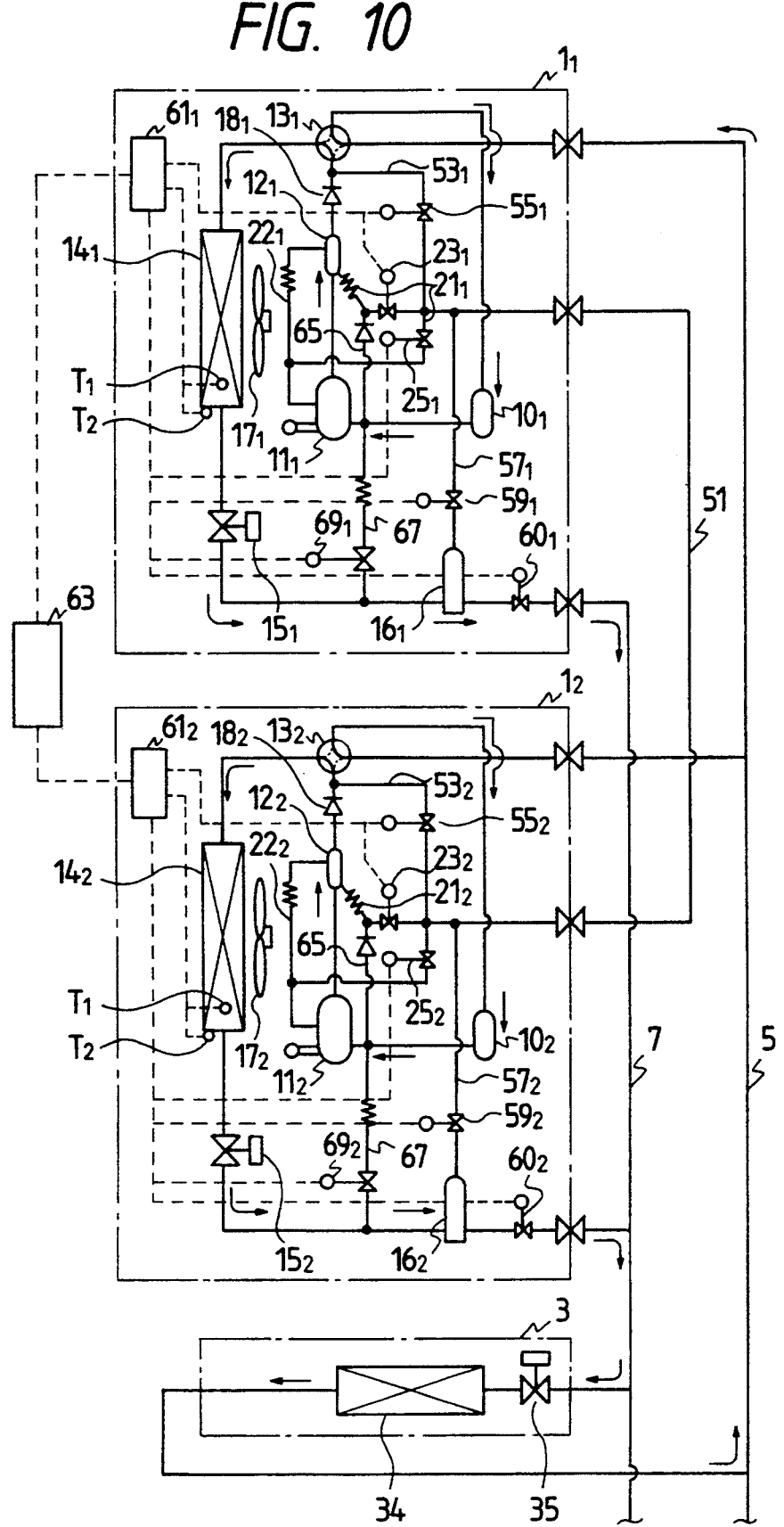
FIG. 10 is a refrigerant circuit diagram of a fourth embodiment of the multiroom air-conditioning apparatus of this invention.

Concretely, as shown in the table of FIG. 10, the third opening and closing valve 55 and the opening and closing valve $60_1$ of the outdoor side unit $1_1$ in operation are opened, and the opening and closing valve $60_2$ of the refrigerant-trapped outdoor side unit $1_2$ in non-operation is opened.

Through this operation, as shown in FIG. 6, a part of the high-pressure refrigerant which is discharged from the compressor $11_1$ is passed through the check valve $18_1$, the third auxiliary pipe $53_1$ and the balance pipe 51 and flows into the refrigerant adjusting container $16_2$ of the outdoor side unit $1_2$ in non-operation. The refrigerant which has been trapped in the refrigerant adjusting container $16_2$ is pushed out by the refrigerant just flowing into the refrigerant adjusting container $16_2$, and flows through the indoor side unit 3 and the liquid pipe 5 into the suck-in side of the compressor $11_1$ of the outdoor side unit $1_1$ in operation.

Through this control operation, the refrigerant lack of the outdoor side unit $1_1$ in operation is redressed, and thus the gas-lacking state is not induced.

If the no existence of the outdoor side unit in non-operation is judged at the step S34 (see FIG. 7), there is no trapped refrigerant, and thus the driving capacity of the refrigerant-lacking outdoor side unit is lowered (at a step S36). If it is an outdoor side unit having a capacity-invariable compressor, the operation of the outdoor side unit is stopped. If it is an outdoor side unit having a compressor with an inverter (capacity-variable compressor), the frequency of the compressor is reduced to lower the rotating speed of the compressor.

This refrigerant push-out control operation is continued for about three minutes (at a step S37).

After three minutes elapse, the judgment at the step S33 is made again (at a step S38). If the judgment at the step S33 is "No", the refrigerant lack is judged to have been redressed, and thus the refrigerant push-out control at the step S35 is ended (at a step S39). On the other hand, if the judgment at the step S33 is "Yes", the refrigerant lack is judged not to have been redressed, and thus the refrigerant push-out control at the step S35 is continued (at a step S40).

However, at the step S40, the refrigerant push-out control operation is continued for about three minutes, and then ended. The control time at the steps S35 and S40 extend to about six minutes, and thus the refrigerant is expected to have been pushed out (flown out). If the refrigerant lack occurs even in such a status, it is judged that there is no trapped refrigerant in the outdoor side unit, so that similarly to the step S36, the driving capacity of the refrigerant-lacking outdoor side unit is lowered (at a step S41).

Figure 8:
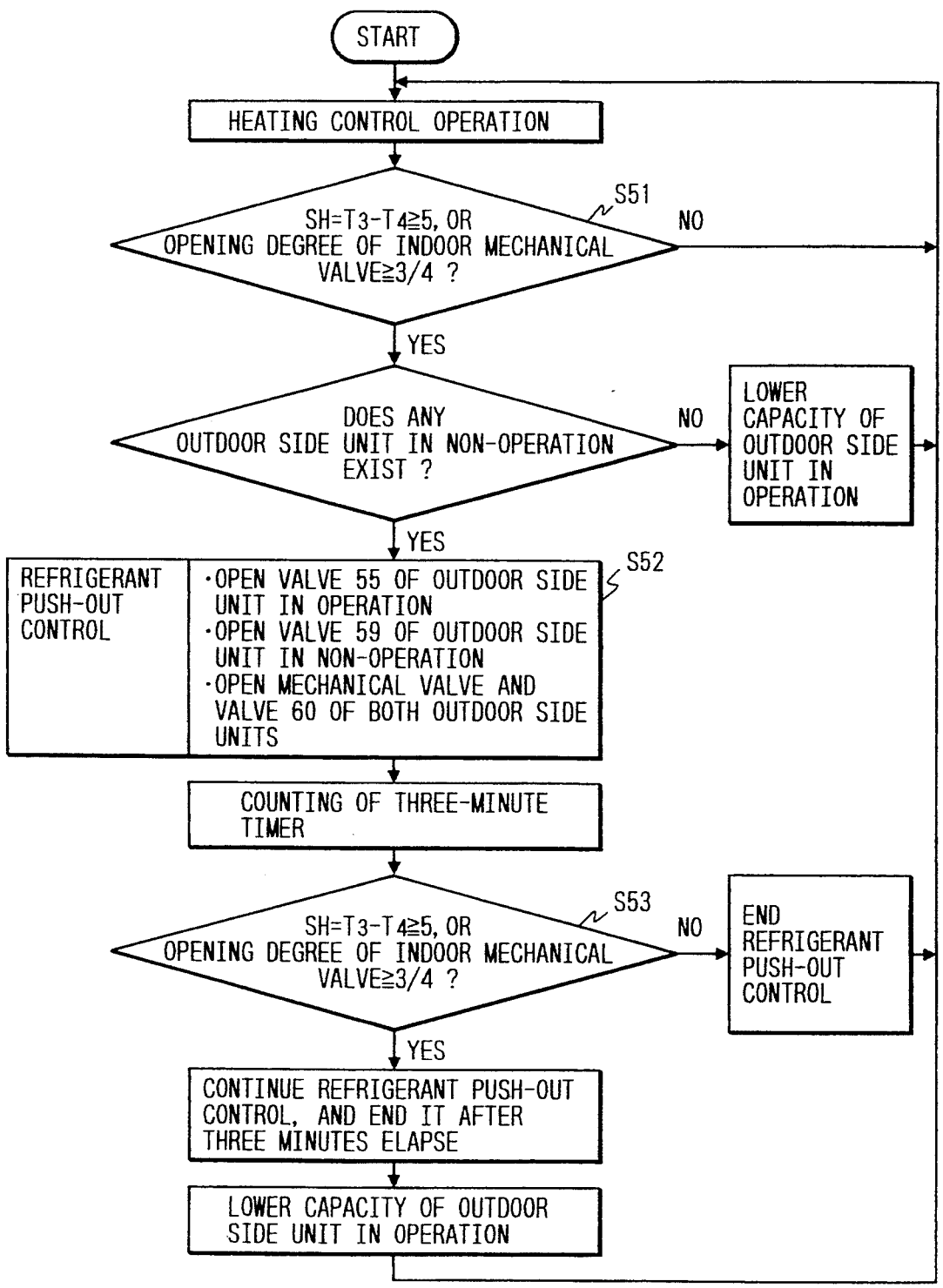
FIG. 8 is a flowchart for a process in the heating operation of the third embodiment.

FIG. 8 is flowchart showing the air-conditioning operation in the heating operation of this embodiment. The different step of the heating operation from that of the cooling operation as shown in FIG. 7 resides in that the judgment of the refrigerant lack is made on the basis of the temperature difference between the temperatures at the outlet and inlet of the outdoor heat exchanger ($SH = T_3 - T_4$) (at steps S51 and S53). The other steps are identical to those of FIG. 7.

Particularly in the heating operation, execution of the refrigerant withdrawing control for withdrawing refrigerant from an outdoor side unit as shown in FIG. 2 is more effective. In the cooling operation, it is more effective that the refrigerant push-out control as shown in FIG. 6 is first carried out and the refrigerant withdrawing control for withdrawing refrigerant from an outdoor side unit as shown in FIG. 2 is carried out when the refrigerant withdrawal is insufficient.

The control operation as described above relates to the control operation for the refrigerant lacking case. The same control operation is also applicable to a lubricating oil lacking case. That is, when an outdoor side unit in operation lacks lubricating oil, the lubricating oil can be withdrawn from an outdoor side unit in non-operation through the above control operation. The opening and closing operation of each valve for the lubricating oil withdrawing control is also shown in the table of FIG. 9.

The embodiments as described above relate to the refrigerant supply control for supply refrigerant to a refrigerant-lacking outdoor side unit. However, this invention is also applicable to a refrigerant removal control for removing refrigerant from a refrigerant-excessive (surplus) outdoor side unit.

FIG. 10 shows another embodiment of the air-conditioning apparatus in which the refrigerant removal control can be performed.

The different point from the refrigerant circuit as shown in FIG. 1 resides in that the suck-in pipe of the compressor $11_1$ and the pipe connected to the refrigerant adjusting container $16_1$ are connected through a pipe 67, and the pipe 67 is provided with an opening and closing valve $69_1$. The other elements of this embodiment are substantially identical to those of FIG. 1. In FIG. 10, $T_1$ represents a sensor for detecting a condensation temperature of the outdoor side unit $14_1$, $14_2$ in the cooling operation, and $T_2$ represents a sensor for detecting a temperature at the outlet of the outdoor side unit $14_1$, $14_2$ in the cooling operation.

Next, the air-conditioning operation of this embodiment will be described.

When the four-way change-over valves $13_1$ and $13_2$ are switched as indicated by an solid line of FIG. 10, refrigerant flows in a direction as indicated by an arrow of FIG. 10. In this case, both of the outdoor side units $1_1$ and $1_2$ are driven, the outdoor electrical expansion valves $15_1$ and $15_2$ are substantially fully opened, and the indoor mechanical valve 35 is adjusted in its opening degree in accordance with an air-conditioning load. Therefore, each of the outdoor heat exchangers $14_1$ and $14_2$ serves as a condenser, and the indoor heat exchanger 34 serves as an evaporator. That is, the cooled air is supplied from the indoor heat exchanger 34 (the cooling operation is carried out).

On the other hand, when the four-way change-over valves are switched as indicated by a dotted line of FIG. 10, the refrigerant flows in a direction opposite to the direction as indicated by the arrow. In this case, both of the outdoor side units $1_1$ and $1_2$ are driven, and the electrical expansion valves $15_1$ and $15_2$ and the indoor mechanical valve 35 are adjusted in their opening degree in accordance with the air-conditioning load. Therefore, each of the outdoor heat exchangers $14_1$ and $14_2$ serves as an evaporator, and the indoor heat exchanger 34 serves as a condenser. That is, the heated air is supplied from the indoor heat exchanger 34 (the heating operation is carried out).

In the air-conditioning apparatus, plural outdoor side units $1_1$ and $1_2$ are connected in parallel to one another in the same system through which the same refrigerant flows. Therefore, when a large amount of the refrigerant concentratively or deviationally flows into an outdoor side unit, a case may occur where surplus or excessive refrigerant is trapped in an outdoor heat exchanger, etc. of an outdoor side unit and the operation of the outdoor side unit is obstructed.

For example, if the surplus refrigerant is trapped in an outdoor heat exchanger in the cooling operation, the heat-discharge area of the outdoor heat exchanger is reduced, so that the liquefaction of the refrigerant is depressed.

Figure 11:
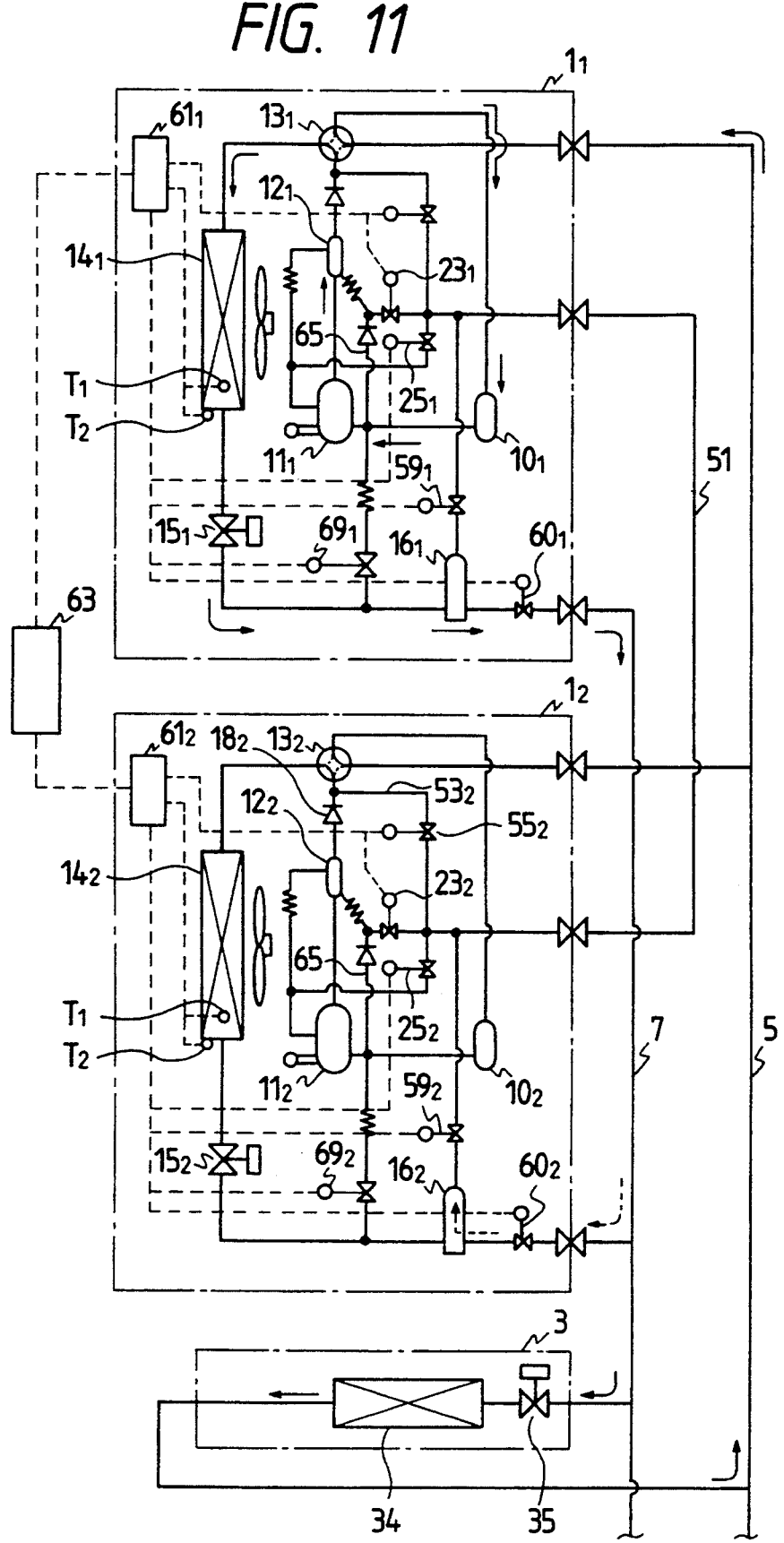
FIG. 11 is a refrigerant circuit diagram showing the refrigerant flow in a refrigerant stocking operation in the cooling operation.

However, according to this embodiment, this problem can be overcome. As shown in FIG. 11, on the assumption that an outdoor side unit in non-operation exists, when surplus refrigerant occurs in an outdoor side unit $1_1$ in operation, the air-conditioning control is so made that the surplus refrigerant is fed to the outdoor side unit $1_2$ in non-operation. In this case, the opening and closing operation of each of the control valves is controlled by the central controller 63 and the individual controllers $61_1$ and $61_2$.

This control operation under the cooling operation will be first described with reference to a flowchart of FIG. 12. The air-conditioning operation is started (at a step S101) to carry out the cooling operation (at a step S102), and it is judged at a step S103 whether the difference SC between the condenser temperature ($T_1$) of the outdoor heat exchanger $14_1$ and the temperature ($T_2$) at the outlet of the outdoor heat exchanger $14_1$ is above 15° C. (SC=($T_1-T_2$)≧15° C.). That is, at the step S103, the subcooling degree of the refrigerant in the outdoor heat exchanger $14_1$ is diagnosed on the basis of the status (SC≧15° C.), and if SC≧15° C., the outdoor heat exchanger $14_1$ is judged to have surplus refrigerant.

If the judgment at the step S103 is "No", the surplus refrigerant is judged not to exist, and thus the cooling operation is continued. On the other hand, if the judgment at the step S103 is "Yes", the surplus refrigerant is judged to exist in an outdoor side unit $1_1$ in operation, and thus it is checked at a step S104 whether there is an outdoor side unit $1_2$ in non-operation into which the refrigerant flows. Here, if the outdoor side unit $1_2$ in non-operation exists, a surplus-refrigerant stocking control for stocking the surplus refrigerant into the outdoor side unit $1_2$ is executed (at a step S5).

Concretely, as shown in FIG. 11, the opening and closing valve $60_2$ of the outdoor side unit $1_2$ is opened, and the opening and closing valves $59_2$ and $69_2$ and the electrical expansion valve $15_2$ are closed.

Through this opening and closing operation, as shown in FIG. 11, the surplus refrigerant stocked in the outdoor side unit $1_1$ (the outdoor heat exchanger $14_1$, etc.) flows from the liquid pipe 7 through the opening and closing valve $60_2$ into the outdoor side unit $1_2$ in non-operation as indicated by a dotted line of FIG. 11. At this time, the opening and closing valves $59_2$ and $69_2$ and the electrical expansion valve $15_2$ are closed, and thus the surplus refrigerant is stocked into the refrigerant adjusting container $16_2$ of the outdoor side unit $1_2$ in non-operation.

Through this operation, even when the surplus refrigerant is stocked in the outdoor side unit $1_1$ in operation, the surplus refrigerant is controlled to flow into the refrigerant adjusting container $16_2$ of the outdoor side unit $1_2$ in non-operation to thereby prevent the surplus refrigerant from being stocked in the outdoor heat exchanger $14_1$ of the outdoor side unit $1_1$. Therefore, reduction of the heat-discharge area of the outdoor heat exchanger is prevented, thereby overcoming the disadvantage of the conventional air-conditioning apparatus that the liquefaction of the refrigerant is depressed.

Referring to FIG. 12 again, if it is judged at the step S104 that there is no outdoor side unit in non-operation, there is no outdoor side unit into which the refrigerant is stocked, and thus the driving capacity of the refrigerant-surplus outdoor side unit is lowered (at a step S106). If it is an outdoor side unit having a capacity-invariable compressor, the operation of the outdoor side unit is stopped. If it is an outdoor side unit having a compressor with an inverter, the frequency is lowered to reduce the rotating speed of the compressor.

The refrigerant stocking control as described above is continued for about three minutes (at a step S107).

After three minutes elapse, the judgment at the step S103 is made again (at a step S108). Here, if the judgment at the step S103 is "No", the surplus refrigerant is judged not to exist, and thus the refrigerant stocking control at the step S105 is ended (at a step S109). On the other hand, if the judgment at the step S103 is "Yes", the surplus refrigerant is judged to exist, and thus the refrigerant stocking control at the step S105 is continued (at a step S110).

At the step S110, the refrigerant stocking control is continued for about three minutes, and then ended.

The control time for the steps S105 and S110 extends to about six minutes, and thus the surplus refrigerant is expected to be stocked into the outdoor side unit in non-operation during this control time. If the surplus refrigerant is judged to exist in the outdoor side unit in operation in such a status, the outdoor side unit in non-operation is considered to have no space in which the surplus refrigerant is stocked, so that similarly to the step S106, the driving capacity of the outdoor side unit in operation is lowered (at a step S111).

Figure 12:
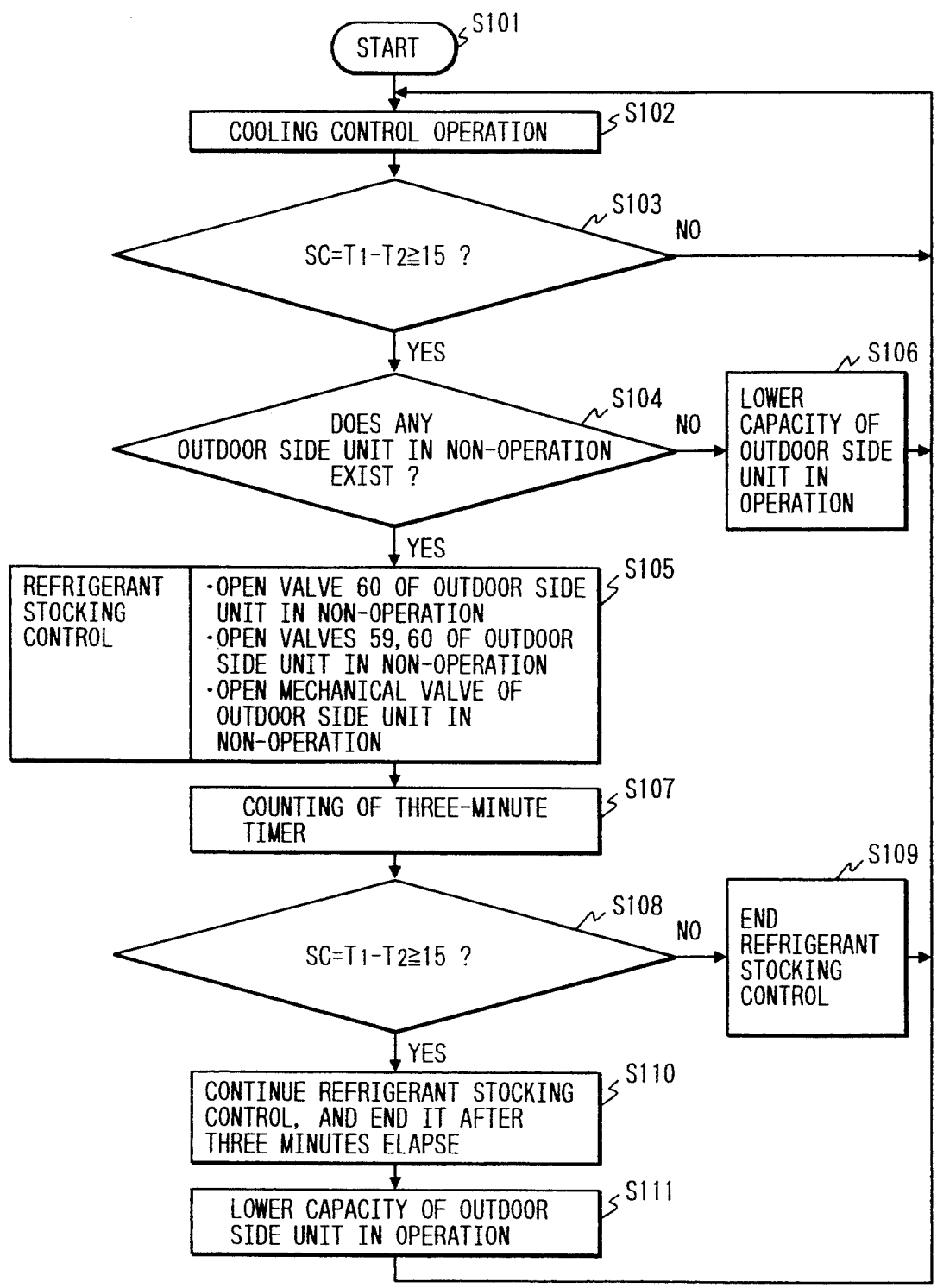
FIG. 12 is a flowchart for a refrigerant stocking process in the cooling operation.
Figure 13:
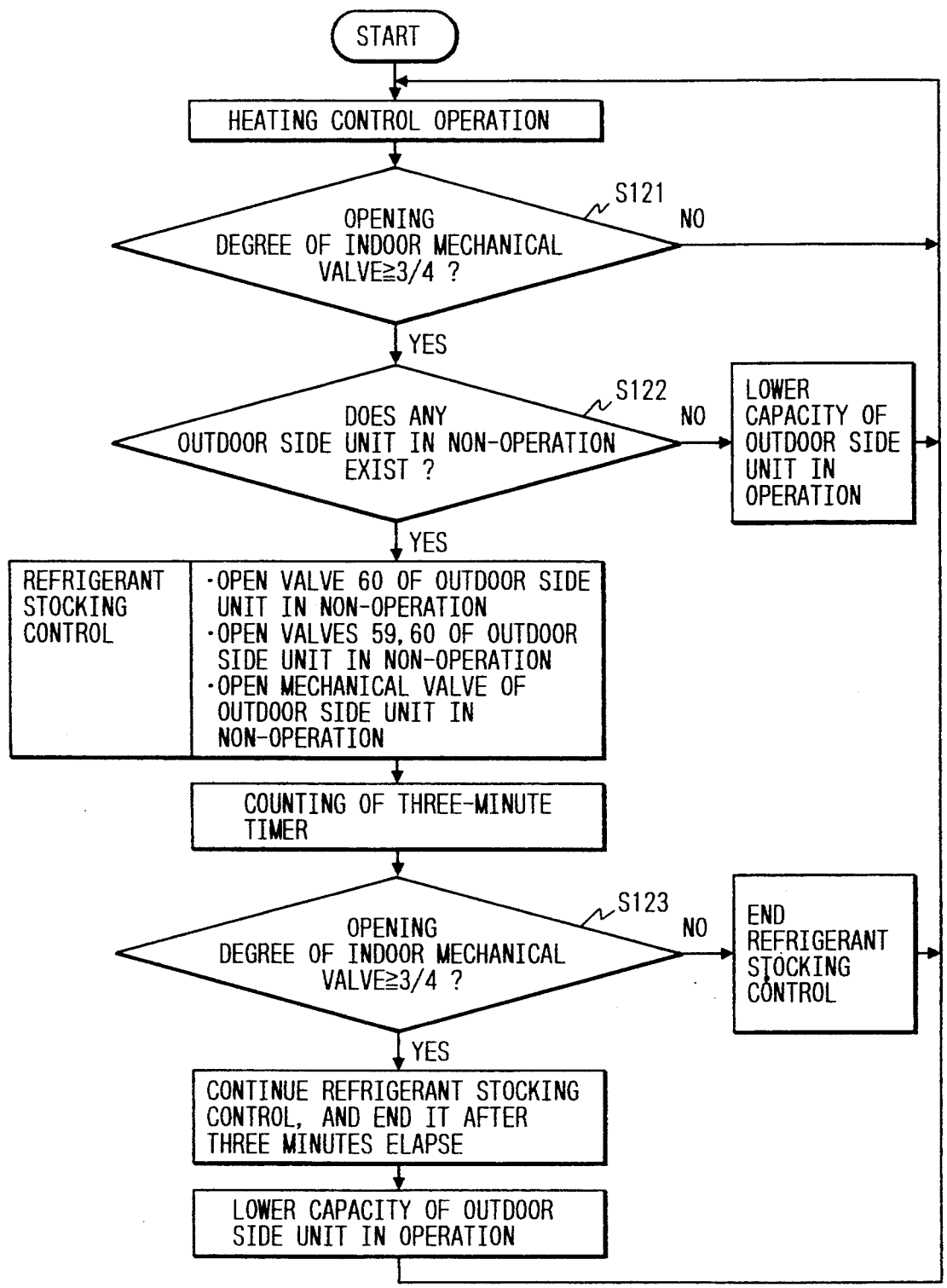
FIG. 13 is a flowchart for a refrigerant stocking process in the heating operation.

FIG. 13 is a flowchart showing the control operation under the heating operation, and the different step of FIG. 13 from that of FIG. 12 resides in that the judgment of presence of the surplus refrigerant is made on the basis of the opening degree of the indoor mechanical valve (at steps S121 and 123).

When the surplus refrigerant is stocked into the outdoor side unit in non-operation, the refrigerant may be stocked not only into the refrigerant adjusting container of the outdoor side unit in non-operation, but also into the outdoor heat exchanger thereof.

Figure 14:
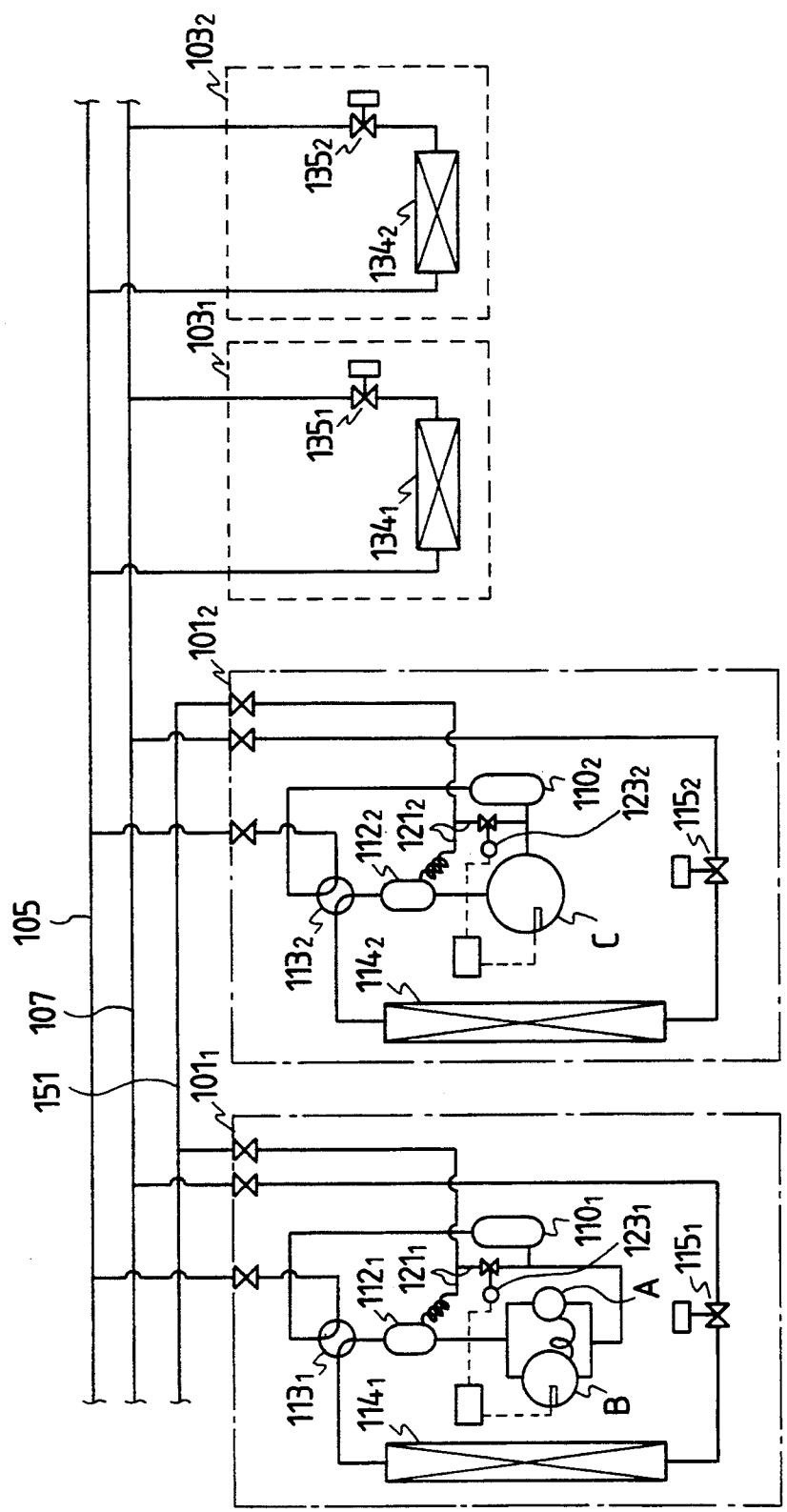
FIG. 14 is a refrigerant circuit diagram of a fifth embodiment of this invention.

FIG. 14 shows another embodiment of the air-conditioning apparatus according to this invention.

In FIG. 14, reference numerals $101_1$ and $101_2$ represent outdoor side units, and reference numerals $103_1$ and $103_2$ represent indoor side units (room units). The outdoor side unit $101_1$ comprises an accumulator $110_1$, a capacity-invariable compressor A, a capacity-variable compressor B whose capacity is variable in accordance with an air-conditioning load in a room, an oil (lubricating oil) separator $112_1$, a four-way change-over valve $113_1$, an outdoor heat exchanger $114_1$ and an outdoor electrical expansion valve $115_1$.

The outdoor side unit $101_2$ comprises an accumulator $110_2$, a capacity-invariable compressor C, an oil (lubricating oil) separator $112_2$, a four-way change-over valve $113_2$, an outdoor heat exchanger $114_2$ and an outdoor electrical expansion valve $115_2$.

Each indoor side unit (room unit) $103_1$ ($103_2$) comprises an indoor heat exchanger $134_1$ ($134_2$), and an indoor electrical expansion valve (indoor mechanical valve) $135_1$ ($135_2$), an inter-unit pipe comprising a gas pipe 105 and a liquid pipe 107 extends from each of the indoor side units $103_1$ and $103_2$, and the outdoor side units $101_1$ and $101_2$ are connected in parallel to the inter-unit pipe.

The oil separator $112_1$ of the outdoor side unit $101_1$ serves to separate lubricating oil which is contaminated in refrigerant discharged from the compressors A and B, and the separated lubricating oil is returned through a return pipe $121_1$ to the compressors A and B. The return pipe $121_1$ is provided with an opening and closing valve $123_1$. The oil separator $112_2$ of the outdoor side unit $101_2$ serves to separate lubricating oil which is contaminated in refrigerant discharged from the compressor c, and the separated lubricating oil is returned through a return pipe $121_2$ to the compressor C. The return pipe $121_2$ is provided with an opening and closing valve $123_2$.

The return pipes $121_1$ and $121_2$ of the outdoor side units $101_1$ and $101_2$ are connected through a balance pipe 151. The balance pipe 151 serves to guide lubricating oil from a compressor having a large amount of lubricating oil to another compressor having a small amount of lubricating oil when the amount of lubricating oil is unbalanced between the compressors of the outdoor side units $101_1$ and $101_2$.

As shown in FIG. 15, the compressor A is a capacity-invariable compressor having 4 horsepowers (ps), the compressor B is a capacity-variable compressor having 6 horsepowers (ps) whose capacity is variable in accordance with the air-conditioning load, and the compressor C is a capacity-invariable compressor having 10 horsepowers (ps).

Here, representing the total output of the compressors of the outdoor side unit having the capacity-invariable compressor A and the capacity-variable compressor B and the output of the compressor of the outdoor side unit having only the capacity-invariable compressor C by ps1 and ps2 respectively, the relationship satisfying the following inequality is preferable in comparison of the horsepower between the compressors:

$$ps1(A+B) \geq ps2(C)$$

In addition, it is preferable that compressor B(ps)≧compressor A(ps). In this embodiment, Ps1(A+B)=ps2(C)=10 horsepowers.

In the air-conditioning apparatus having the above combination of the compressors, for example when the air-conditioning load is reduced to a value lower than the maximum output of the air-conditioning apparatus in the operation, some outdoor side units are so controlled that the operation of these outdoor side units is ceased.

In such a control operation, according to this embodiment, the output of the air-conditioning apparatus is so controlled as to be smoothly variable (controllable) over the air-conditioning load range from the minimum (zero) load to the maximum load as shown in FIG. 15.

That is, in order to control the output of the air-conditioning apparatus in the range of 1 to 6 ps, the capacity-variable compressor B of the outdoor side unit $101_1$ is driven, and the driving capacity thereof is controlled in its capacity-variable range. In order to control the output of the air-conditioning apparatus in the range of 7 to 10 ps, the capacity-invariable compressor A (4 ps) of the outdoor side unit $101_1$ is continued to be driven while the capacity-variable compressor B of the outdoor side unit $101_1$ is controlled to vary its output in the range of 3 to 6 ps. Further, in order to control the output of the air-conditioning apparatus in the range of 11 to 16 ps, the capacity-invariable compressor C (10 ps) is continued to be driven while the capacity-variable compressor B of the outdoor side unit $101_1$ is controlled to vary its output in the range of 1 to 6 ps. Still further, in order to control the output of the air-conditioning apparatus in the range of 17 to 20 ps, the capacity-invariable compressor C (10 ps) of the outdoor side unit $101_2$ and the capacity-invariable compressor A (4 ps) of the outdoor side unit $101_1$ are continued to be driven while the capacity-variable compressor B of the outdoor side unit $101_1$ is controlled to vary its output in the range of 3 to 6 ps. Through this operation, the output of the air-conditioning apparatus can be smoothly varied (controlled) over the range of the minimum (zero) load to the maximum (rating) load.

FIG. 15 shows one example of combination of the compressors, and a large number of combinations of the compressors can be proposed as shown in tables of FIGS. 16 and 17. In the tables of FIGS. 16 and 17, each of INV5(5 ps) and INV6(6 ps) represents a compressor having only a capacity-invariable compressor, INV8(8 ps) represents a compressor having a capacity-variable compressor of 5 ps and a capacity-invariable compressor of 3 ps, and INV10(10 ps) represents a compressor having a capacity-variable compressor of 6 ps and a capacity-invariable compressor of 4 ps.

For example, in FIGS. 16 and 17, for the maximum output of 16 ps, a combination of the INV8(8 ps) and the rating (capacity-invariable compressor) 8 ps may be adopted. For the maximum output of 20 ps, a combination of the INV10(10 ps) and the rating (capacity-invariable compressor) 10 ps may be adopted. Further, for the maximum output of 23 ps, a combination of the INV5(5 ps), the INV8(8 ps) and the rating (capacity-invariable compressor) 10 ps may be adopted. For the maximum output of 25 ps, a combination of the INV5(5 ps), the INV10(10 ps) and the rating (capacity-invariable compressor) 10 ps may be adopted.

According to these combinations, representing the total of the outputs of the outdoor side unit having the capacity-invariable compressor and the capacity-variable compressor by ps1 and representing the output of the outdoor side unit having only the capacity-invariable compressor by ps2, the following equation is satisfied: ps1≧ps2. With the combinations of the compressors which satisfy the above equation, the output of the air-conditioning apparatus can be smoothly varied (controlled) over the whole range from the zero load to the maximum load.

Figure 18:
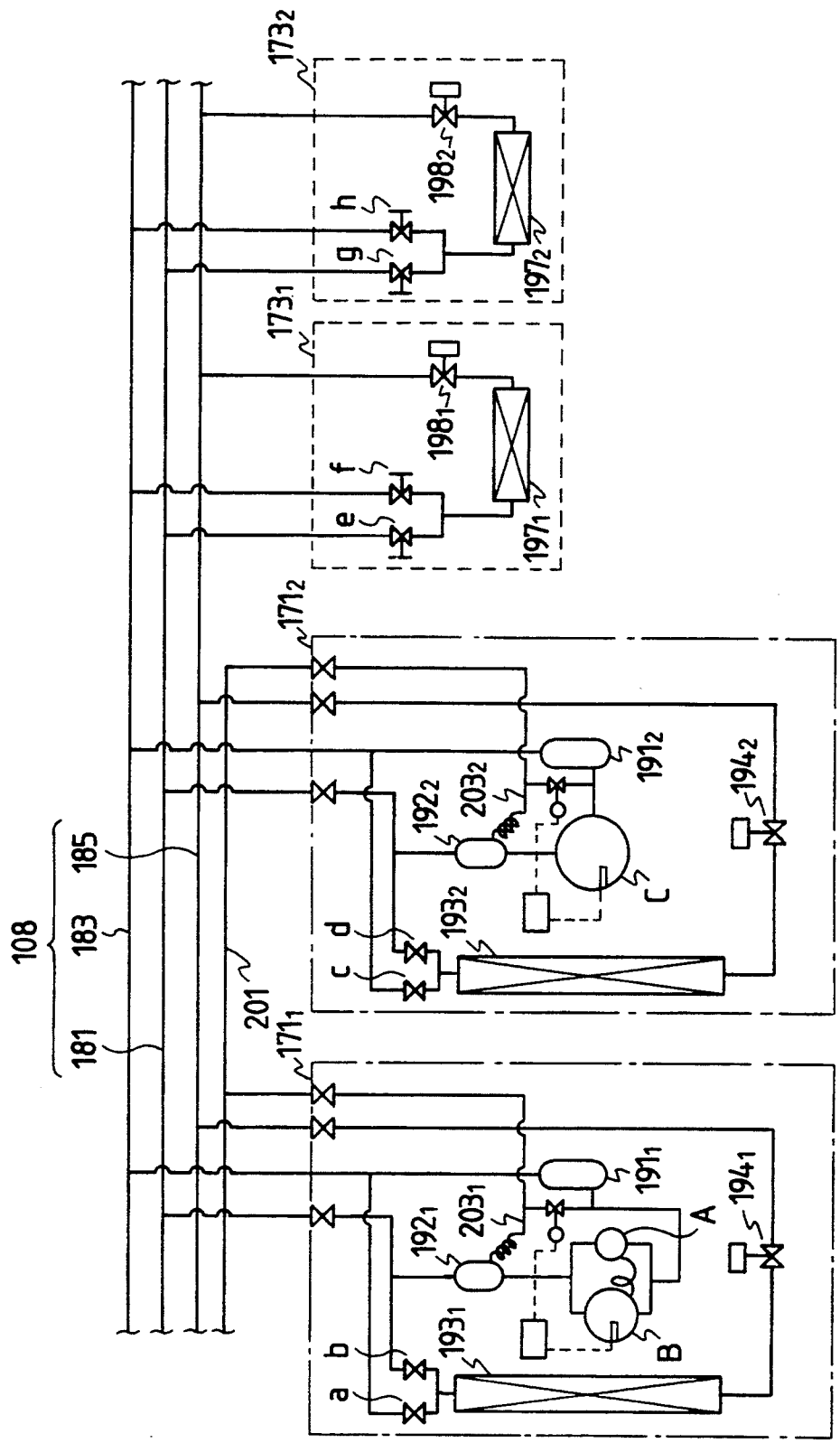
FIG. 18 is a refrigerant circuit diagram of a modification of the fifth embodiment.

FIG. 18 shows a modification of this embodiment.

Reference numerals $171_1$ and $171_2$ represent outdoor side units, and reference numerals $173_1$ and $173_2$ represent indoor side units. The outdoor side unit $171_1$ comprises an accumulator $191_1$, a capacity-invariable compressor A, a capacity-variable compressor B, an oil (lubricating oil) separator $192_1$, an outdoor heat exchanger $193_1$, and an outdoor electrical expansion valve $194_1$. The outdoor side unit $171_2$ comprises an accumulator $191_2$, a capacity-invariable compressor, an oil separator $192_2$, an outdoor heat exchanger $193_2$, and an outdoor electrical expansion valve $194_2$. The indoor side unit $173_1$ ($173_2$) comprises an indoor heat exchanger $197_1$ ($197_2$), and an indoor electrical expansion valve $198_1$ ($198_2$) (indoor mechanical valve).

The indoor side units $173_1$ and $173_2$ are connected to the indoor side units $171_1$ and $171_2$ through an inter-unit pipe 108 comprising a high-pressure gas pipe 181, a low-pressure gas pipe 183 and a liquid pipe 185, and the pipes 181, 183 and 185 are provided with refrigerant flow passageway change-over valves a, b, c, d, e, f, g and h for enabling each of the heat exchangers $175_1$ and $175_2$ of the indoor side units $173_1$ and $173_2$ to act as a condenser or evaporator as shown in FIG. 18.

That is, through the suitable switching operation of the change-over valves a, b, c, d, e, f, g and h, the refrigerant flow is varied, and one outdoor side unit $173_1$ can be driven in a heating operation while the other outdoor side unit $173_2$ can be driven in a cooling operation, for example. A reference numeral 201 represents a balance pipe for connecting return pipes $203_1$ and $203_2$.

According to this embodiment, similarly in the embodiment as shown in FIG. 14, the total of the maximum outputs of the compressors of the outdoor side unit having the capacity-invariable compressor A and the capacity-variable compressor B (ps1) and the output of the compressor of the outdoor side unit having only the capacity-invariable compressor C (ps2) are set so as to satisfy the following equation: ps1(A+B)≧ps2(C). It is also preferable that compressor B (ps)≧compressor A (ps).

According to this embodiment, like the embodiment of FIG. 14, the output of the air-conditioning apparatus can be smoothly varied (controlled) over the air-conditioning load range from the minimum (zero) load to the maximum load.

What is claimed is:

1. An air-conditioning apparatus, including:
   at least one indoor side unit having an inter-unit pipe extending therefrom;
   plural outdoor side units which are connected in parallel to said inter-unit pipe extending from said indoor side unit:
   opening and closing means which is provided to each of said outdoor side units and serves to control refrigerant flow between said indoor side unit and said outdoor side unit through an opening and closing operation thereof;
   individual control means which is provided to each of said outdoor side units and serves to control the opening and closing operation of said opening and closing means;
   detection means for detecting excess or lack state of refrigerant amount and/or lubricating oil amount in an outdoor side unit, which will obstruct the operation of said outdoor side unit; and
   central control means for collectively and concentratively controlling each of said individual control means of said plural outdoor side units to adjust the amount of the refrigerant and/or lubricating oil flowing among said plural outdoor side units, so that the excess or lack state of the refrigerant and/or lubricating oil amount of said outdoor side unit is redressed.

2. The air-conditioning apparatus as claimed in claim 1, further including a refrigerant flowing passageway which is provided between said outdoor side units and through which refrigerant and lubricating oil flow between said plural outdoor side units.

3. The air-conditioning apparatus as claimed in claim 2, wherein each of said outdoor side units comprises a compressor for compressing the refrigerant, an oil separator for separating lubricating oil from the refrigerant, an outdoor heat exchange for exchanging heat between the refrigerant and an outside air, a first refrigerant withdrawing passageway through which said outdoor heat exchanger and said refrigerant flowing passageway are intercommunicated with each other, and an oil withdrawing passageway through which said oil separator and said refrigerant flowing passageway are intercommunicated with each other.

4. The air-conditioning apparatus as claimed in claim 3, wherein said first refrigerant withdrawing passageway has an opening and closing valve for controlling the refrigerant flow between said outdoor heat exchanger and said refrigerant flowing passageway through an opening and closing operation thereof, the operation of said opening and closing valve being controlled on the basis of the detection of excess or lack of refrigerant amount by said central control means.

5. The air-conditioning apparatus as claimed in claim 4, wherein when the excess or lack of refrigerant amount and/or lubricating oil amount in an outdoor side unit is detected by said central control means, said central control means controls said opening and closing means and said opening and closing valve to allow the refrigerant and/or lubricating oil to flow between said outdoor side unit suffering the excess or lack state of the refrigerant amount and/or the lubricating oil amount and a predetermined outdoor side unit in such a direction that the excess or lack of the refrigerant amount and/or the lubricating oil amount is redressed.

6. The air-conditioning apparatus as claimed in claim 3, wherein said oil withdrawing passageway has an opening and closing valve for controlling the flow of the lubricating oil between said oil separator and said refrigerant flowing passageway through an opening and closing operation thereof, and the driving of the said opening and closing valve is controlled on the basis of the detection of the excess or lack of the refrigerant amount by said central control means.

7. The air-conditioning apparatus as claimed in claim 3 wherein said outdoor side unit further including a refrigerant adjusting container, a second refrigerant withdrawing passageway intercommunicating said refrigerant adjusting container and said first refrigerant withdrawing passageway for allowing the refrigerant to flow therebetween, and a third refrigerant withdrawing passageway intercommunicating said first refrigerant withdrawing passageway and a suck-in pipe of said compressor for allowing the refrigerant therebetween, each of said second and third refrigerant withdrawing passageways having an opening and closing valve for controlling refrigerant flow therethrough, and the driving of said opening and closing valve being controlled on the basis of the detection of the excess or lack of the refrigerant amount by said central control means.

8. The air-conditioning apparatus as claimed in claim 7, wherein when a refrigerant-lacking state is detected for an outdoor side unit, said central control means controls said opening and closing means and said opening and closing valve so that a part of high-pressure refrigerant in said refrigerant-lacking outdoor side unit is fed from said first refrigerant withdrawing passageway of said outdoor side unit through said refrigerant flowing passageway to said refrigerant adjusting container of a refrigerant-trapped outdoor side unit to push out the refrigerant trapped in said refrigerant-trapped outdoor side unit.

9. The air-conditioning apparatus as claimed in claim 8, wherein said detection means comprises a first sensor for detecting a condensation temperature of said outdoor heat exchanger and a second sensor for detecting a temperature at the outlet of said outdoor heat exchanger, the excess or lack state of the refrigerant amount in said outdoor side unit being detected on the basis of the difference between the detected temperatures by said first and second sensors.

10. An air-conditioning apparatus comprising at least one indoor side unit having an inter-unit pipe extending therefrom, a plurality of outdoor side units which are connected in parallel to the inter-unit pipe, and means for controlling the number of outdoor side units to be operated in accordance with an air-conditioning load, at least a first of said outdoor side units having a capacity-invariable compressor and a capacity-variable compressor whose capacity is variable in accordance with the air-conditioning load, each of a remainder of said outdoor side units, other than said first outdoor side unit, having only a capacity-invariable compressor, and a total output ps1 of said first outdoor side unit and an output ps2 of each of said remainder of said outdoor side units being set so as to satisfy the following equation: $ps1 \geq ps2$.

11. The air-conditioning apparatus as claimed in claim 10, further including control means for controlling a driving of said capacity-invariable compressor and said capacity-variable compressor so that the output of said air-conditioning apparatus can be smoothly variable over an air-conditioning load range from a zero load to a maximum load.

12. The air-conditioning apparatus as claimed in claim 10, further including a refrigerant flowing passageway through which said plurality of outdoor side units are connected to one another to allow lubricating oil and/or refrigerant therebetween.

13. The air-conditioning apparatus as claimed in claim 10, wherein each of said outdoor side units comprises a compressor, an oil separator for separating the lubricating oil and the refrigerant from each other, an outdoor heat exchanger for exchanging heat between the refrigerant and outside air, and an oil withdrawing passageway through which said oil separator and said refrigerant flowing passageway are in fluid communication with each other.

* * * * *